`US008488486B2`

(12) United States Patent
Ikeda et al.

(10) Patent No.: US 8,488,486 B2
(45) Date of Patent: *Jul. 16, 2013

(54) MULTI-INTERFACE COMMUNICATION DEVICE, TERMINAL, AND PATH SWITCHING METHOD

(75) Inventors: Shinkichi Ikeda, Kanagawa (JP); Masayuki Kumazawa, Kanagawa (JP); Makoto Funabiki, Osaka (JP)

(73) Assignee: Panasonic Corporation, Osaka (JP)

( * ) Notice: Subject to any disclaimer, the term of this patent is extended or adjusted under 35 U.S.C. 154(b) by 285 days.

This patent is subject to a terminal disclaimer.

(21) Appl. No.: 13/004,249

(22) Filed: Jan. 11, 2011

(65) Prior Publication Data

US 2011/0103255 A1   May 5, 2011

Related U.S. Application Data

(63) Continuation of application No. 11/718,564, filed as application No. PCT/JP2005/020269 on Nov. 4, 2005, now Pat. No. 7,894,383.

(30) Foreign Application Priority Data

Nov. 4, 2004  (JP) ................................. 2004-320237

(51) Int. Cl.
*H04L 12/26* (2006.01)
(52) U.S. Cl.
USPC ........................................................ 370/252
(58) Field of Classification Search
USPC .................. 370/241, 252, 310, 328, 329, 331
See application file for complete search history.

(56) References Cited

U.S. PATENT DOCUMENTS

| 6,658,011 | B1* | 12/2003 | Sevanto et al. ................ 370/401 |
| 7,136,389 | B2 | 11/2006 | Shahrier et al. |
| 7,187,931 | B2 | 3/2007 | Trossen |
| 7,313,628 | B2 | 12/2007 | Chaskar et al. |
| 7,385,957 | B2 | 6/2008 | O'Neill |
| 7,657,634 | B2* | 2/2010 | Zheng et al. .................. 709/228 |
| 7,764,696 | B2 | 7/2010 | Kumazawa et al. |
| 7,839,866 | B2* | 11/2010 | Chen et al. .................... 370/399 |

(Continued)

FOREIGN PATENT DOCUMENTS

| CN | 1260650 A | 7/2000 |
| EP | 1009183 A1 | 6/2000 |
| JP | 11-46207 A | 2/1999 |

(Continued)

OTHER PUBLICATIONS

Chinese Office Action for PCT JP2005/020269, Aug. 3, 2010, Panasonic Corporation.

(Continued)

*Primary Examiner* — Chi Pham
*Assistant Examiner* — Robert Lopata
(74) *Attorney, Agent, or Firm* — RatnerPrestia

(57) ABSTRACT

A router, if judging that a routing function is impossible to execute, sends out a connection instruction message including the address of a terminal on a local network terminating the relaying flow, to another router to solicit switching. The router having received the connection instruction message starts a process for connecting with an external network while executing a process for link connection with a terminal, and then sends out a connection completion notice message when the connection with both the external network and the terminal is established. This process enables the router to switch a path rapidly.

4 Claims, 14 Drawing Sheets

U.S. PATENT DOCUMENTS

| | | | |
|---|---|---|---|
| 2003/0187926 A1* | 10/2003 | Karjanlahti | 709/204 |
| 2004/0202126 A1 | 10/2004 | Leung et al. | |
| 2005/0257002 A1 | 11/2005 | Nguyen | |
| 2007/0076608 A1* | 4/2007 | Samuel et al. | 370/230 |
| 2009/0097490 A1* | 4/2009 | Sanderson et al. | 370/395.53 |

FOREIGN PATENT DOCUMENTS

| | | |
|---|---|---|
| JP | 11-261561 A | 9/1999 |
| JP | 2002-232463 A | 8/2002 |
| WO | WO 2004/093397 A1 | 10/2004 |

OTHER PUBLICATIONS

International Search Report for Application No. PCT/JP2005/020269. Dec. 6, 205, Panasonic Corporation.

* cited by examiner

FIG. 12
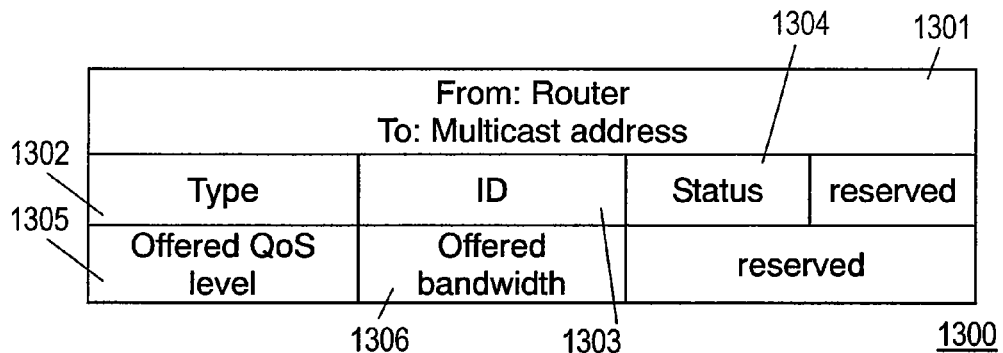
FIG. 13
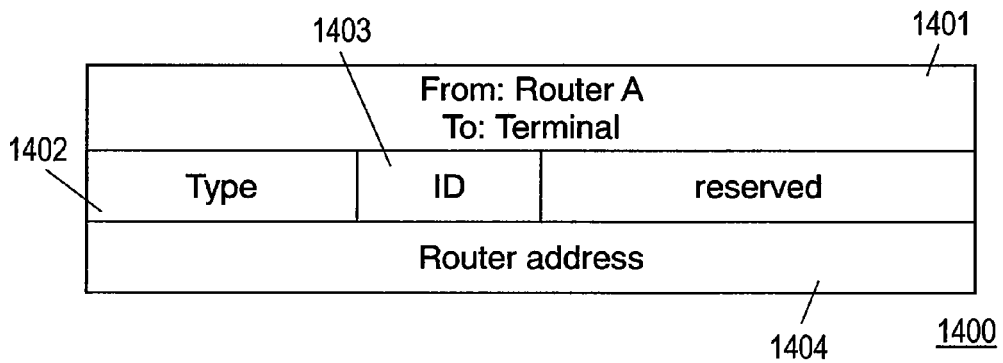
FIG. 14
| Level value | Performance |
|---|---|
| 0 | Background |
| 1 | Interactive |
| 2 | Streaming |
| 3 | Conversational |
| ............ | ............ |
| ............ | ............ |

| Router address | QoS level | Bandwidth |
|---|---|---|
| 11:22:33:44:55:66 | 0 | 10Mbps |
| 22:33:44:55:66:77 | 1 | 1Mbps |

FIG. 17

| Event type | Delivery destination | Local delivery destination |
|---|---|---|
| Link disconnection notice | 33:44:55:66:77:88 | — |
| Connection possibility notice | 22:33:44:55:66:77 | — |
| | 00:00:00:00:00:00 | Router switching unit |

| Event type | Delivery destination | Local delivery destination | Event transmission origin |
|---|---|---|---|
| Connection possibility notice | 00:00:00:00:00:00 | Router switching unit | 11:22:33:44:55:66 |

100

… (1) IP address of the router

MULTI-INTERFACE COMMUNICATION DEVICE, TERMINAL, AND PATH SWITCHING METHOD

This application is a continuation of U.S. patent application Ser. No. 11/718,564, filed May 3, 2007, which is a U.S. National Phase Application of PCT International Application PCT/JP2005/020269, filed Nov. 4, 2005, the entire disclosures of which are incorporated herein by reference.

TECHNICAL FIELD

The present invention relates to a multi-interface communication device having plural communication interfaces and to a path switching method in which plural multi-interface devices are switched, particularly to a path switching method in which two or more routers that are multi-interface devices are switched.

BACKGROUND ART

Conventionally, a terminal device for mobile communication has been implemented by adding a wireless access interface to a mobile terminal.

However, a wireless access network connected by a wireless access interface has different coverage, bandwidth, communication charge, and the like, depending on its type. Accordingly, to continue communication wherever the terminal device moves, the terminal has been required that has plural interfaces to handle plural wireless access networks with different coverage. Equipping such plural wireless access interfaces on a terminal device undesirably increases its cost and size, which is particularly problematic when plural terminal devices are carried.

As a means to solve the problem, the following technique is disclosed in the literature "Research on Seamless Handover in Mobile Network (in Japanese)" (Taisuke Matsumoto et al., IEICE Technical Report, NS2002-323, March 2003). That is, a local area network (LAN) is formed with plural mobile terminals having a short distance wireless interface with lower cost and smaller size than a wireless access interface, and more than one router to which the mobile terminals connected through a short-distance wireless line, with a wireless access interface added thereto, where a mobile terminal other than the router connects to an external network through the router.

In mobile communication, a terminal device particularly needs to be used while switching routers loaded with wireless access interfaces with different coverage (e.g. cellular and wireless LAN) according to its location. A communication interruption occurring due to the switching during telephone conversation is problematic in communication quality, and a technique to avoid the problem is disclosed in the above literature.

In an IP (Internet Protocol) network, what is called a default router needs to be set when a terminal device in a local area network (LAN) communicates with a terminal device in an external network. Such a default router can be set automatically by the router to terminal devices through Neighbor Discovery for IP Version 6 (referred to as "ND" hereinafter), and the setting method is disclosed in the literature "Neighbor Discovery for IP Version 6 (IPv6)" (T. Narten et al., RFC 2461, IETF, December 1998). The method is described hereinafter.

In ND, a Router Advertisement message (referred to as "RA message" hereinafter) including the following information is transmitted from the router periodically or in response to a Router Solicitation message (referred to as "RS message" hereinafter).

(1) IP address of the router
(2) Period of validity of information included in the relevant message (Router Lifetime, referred to as "RL" hereinafter)
(3) Reachable Time (referred to as "RT" hereinafter)

A terminal device that has received this RA message adds the above information to its own default router list and neighbor cache. If plural routers are registered in the default router list, the terminal device selects the primary router from the entries in the default router list when transmitting to a destination not registered in the routing table. The primary router broadcasts an RA message with RL=0 when the router itself shuts down. Receiving the RA message with RL=0, the terminal device, if a corresponding entry exists in the default router list, deletes the relevant entry. According to the literature "Neighbor Discovery for IP Version 6 (IPv6)", however, the default router transmits an RA message with RL=0 only when the router itself shuts down. This disables the terminal device to communicate because regular RA messages remain transmitted even when connection of the router to an external network is overloaded, or difficult or impossible due to decreased radio signal strength when connected through a wireless access interface. In order for the terminal device to switch the default router to another, the terminal device needs to recognize that communication with an external terminal device has been disabled, which requires a long time. Accordingly, when communication of the router with an external network is disabled because of a reason other than a shutdown, the communication is undesirably interrupted over a long time.

In a LAN having a conventional duplexed router, a method for switching from the master router to the backup router when a failure occurs in the master router is disclosed in Japanese Patent Unexamined Publication No. H11-261561. That is, the backup router requests a health check to the master router, and then the backup router is automatically switched to the master router unless a health check reply is returned from the master router. However, to use the method disclosed in Publication No. H11-261561, plural routers need to share the same MAC address, which is unusable in some wireless networks where authentication at the MAC layer is performed.

Particularly, for a local network connecting to an external network through wireless communication, the backup router needs to remain unconnected to save power consumption and to establish connection with the external network when switching from the backup router to the master. For this reason, the following technique has been proposed. That is, in order for the backup router to be switched to the master rapidly, the backup router starts establishing connection with the external network when the connection state of the master router becomes unstable.

In the conventional method described in WO 2004/093397, for example, the master router broadcasts to all the nodes in the LAN, an RA message with RL=0 as a routing stop message when executing a routing function is expected to be disabled due to overloaded connection of the router to an external network or due to decreased radio signal strength when connected through a wireless interface. Then, the backup router broadcasts to all the nodes in the LAN, a routing possible message if the own routing function is executable or to be executable in a given time allowing for processing time to connect to the external network. The routing possible message at this moment uses an RA message with a time period required to become executable set thereto, to notify of the executable time. Then, a node on the LAN that has received the routing stop message and routing possible message updates its own routing table and switches the default router for connecting to the external network after the notified executable time elapses.

However, in the method disclosed in WO 2004/093397, a node on the LAN waits for updating the routing table until the executable time described in the routing possible message elapses although the switching-destination router has actually completed connection with the external network, thus disabling rapid router switching. Meanwhile, the node updates the routing table when the executable time elapses although connection with the external network has not completed actually, thus failing to receive packets.

Further, in a LAN employing a connection oriented protocol such as Bluetooth (registered trademark), a node on the LAN cannot receive a routing possible message transmitted by the switching-destination router if the node has not established Layer 2 connection for transmitting IP packets with the switching-destination router, thus disabling normal router switching.

Even if a node during communication searches for a default router autonomously to attempt switching after receiving a routing stop message from the switching-origin router, link connection with the switching-destination router has not been established, and thus the routing table cannot be updated. Accordingly, even if connection of the switching-destination router to an external network is completed, the node cannot execute path switching until link connection with the switching-destination router is established.

SUMMARY OF THE INVENTION

An object of the present invention is to reduce packet loss due to communication interruption as a result that a master router is switched from a switching-origin router to a switching-destination router rapidly when the switching-origin router as the master router malfunctions in a wireless network, to utilize the network resources efficiently.

In the present invention, a first router sends out to a second router, a connection instruction message including the address of one or more terminal on the local network terminating the relaying flow, if the routing function is detected to be disabled due to overloaded connection of the router to an external network or due to decreased radio signal strength when connected through a wireless interface. The second router, when receiving the connection instruction message, sends out a connection instruction reply message to the first router if its own routing function is executable at the time, or is to be executable in a given time when making a connection with the external network is completed, to start a process for connecting to the external network. The second router, along with a process for connecting to the external network, if connection with one or more terminal on the local network, whose address is included in the connection instruction message, is not established, executes a process for connecting to the terminal. Then, the second router sends out a connection completion notice message to the first router when both connections to the external network and to the terminal on the local network are established.

The first router, when receiving the connection completion notice message, sends out a path switching instruction message for instructing the terminal on the local network terminating the relaying flow to switch the default router. Then, the terminal on the local network, when receiving the path switching instruction message, switches the default router from the first router to the second one.

Consequently, the terminal on the local wireless network establishes connection at the request of the second router even if the terminal has not established Layer 2 connection with the second router, and thus can receive a connection completion notice from the second router. The second router executes the process for connecting to the external network concurrently with establishing link connection with a specified terminal, thus allowing rapid router switching with a minimum of time loss due to the difference between the processing times of the connections.

The terminal simply needs to update the routing table and to change the default router when switching the router, and does not need to manage the time until the routing function of the switching-origin router stops and the switching-destination router becomes routable.

The path switching method according to the first aspect of the present invention is one in which plural multi-interface communication devices having plural communication interfaces on the same local wireless network are switched. The method has a step in which a first multi-interface communication device sends out a connection instruction to a second multi-interface communication device; a step in which the second multi-interface communication device starts the process for connecting to an external network when receiving a connection instruction; a step in which the second multi-interface communication device, when completing connection, sends out a connection completion notice for notifying of the completion of the connection, to the first multi-interface communication device, and a self information notice for notifying of the self network information, to the local wireless network; a step in which the first multi-interface communication device, when receiving the connection completion notice, notifies the local wireless network of a path switching instruction; and a step in which a terminal on the local wireless network, that has received the self information notice and the path switching instruction, changes the multi-interface communication device used for relaying from the first multi-interface communication device to the second one.

These steps allow the second multi-interface communication device (switching-destination multi-interface communication device) as a switching destination to timely start switching of the relay process from the first multi-interface communication device (switching-origin multi-interface communication device) as a switching origin, and to execute a switching process at the relay destination for the terminal in real time in line with an event such as completion of the process for connecting to an external network, to implement rapid path switching.

The router switching method according to the second aspect of the present invention is one in which a connection instruction from the first multi-interface communication device is sent out in one of the following cases. That is, the cases where the rate of packet loss in communication of the first multi-interface communication device with the external network is higher than a given value; where the intensity of received radio waves is lower than a given value; where a self shutdown is started; and where a request for switching to another multi-interface communication device is received.

This enables the switching-origin multi-interface communication device to promptly notify the switching-destination multi-interface communication device that connection to the external network is discontinued.

The path switching method according to the third aspect of the present invention has a step in which a connection process by the second multi-interface communication device is started if the possibility of connection with an external network exists, and additionally the second multi-interface communication device sends out a connection instruction reply for notifying the first multi-interface communication device that connection to the external network has been started.

This step allows the switching-origin multi-interface device to learn that the switching-destination multi-interface device has started connection to the external link, thus dispensing with transmitting a connection instruction with another multi-interface device specified.

The path switching method according to the fourth aspect of the present invention is one in which the first multi-interface communication device sends out communication performance requirements based on the property of a communication flow being relayed, included in a connection instruction, and the second multi-interface communication device starts a connection process if the performance of communication with the external network as a connection target further satisfies the communication performance requirements.

This process enables the switching-origin multi-interface communication device to select a switching-destination multi-interface device according to the property of the current relay flow, thus preventing a failure of the relay flow due to path switching.

The path switching method according to the fifth aspect of the present invention further has a step in which the second multi-interface communication device does not start a process for connecting to an external network if there is no possibility of connection with an external network, or the communication performance requirements are not satisfied although there is possibility of the connection, and sends out a connection instruction reply for notifying that the second multi-interface communication device did not execute connection with the external network.

This step allows the switching-origin multi-interface device to promptly learn the fact that the initial switching-destination multi-interface device is useless, and to rapidly shift the switching process to another switching-destination multi-interface device.

The path switching method according to the sixth aspect of the present invention further has a step in which the first multi-interface communication device sends out a path switching instruction to the third multi-interface communication device if receiving from the second multi-interface communication device, a connection instruction reply for notifying that connection with the external network was not executed.

This step allows the switching-origin multi-interface communication device to rapidly change the switching-destination from the second multi-interface communication device to the third multi-interface device.

The path switching method according to the seventh aspect of the present invention is one in which the second multi-interface communication device, after or instead of sending out a connection completion notice, instead of the step in which the first multi-interface communication device notifies of a path switching instruction, notifies a local wireless network of the path switching instruction.

This process allows the first multi-interface communication device to notify a node on the local wireless network of a path switching instruction earlier than sending out the path switching instruction.

The path switching method according to the eighth aspect of the present invention further has a step in which the first multi-interface communication device sends out to the second multi-interface communication device, a terminal identifier for specifying a terminal during relaying on the local wireless network, along with a connection instruction; and a step in which the second multi-interface communication device starts a process for connecting to a terminal specified by the terminal identifier.

These steps allow the terminal to establish a link with the switching-destination multi-interface communication device during the path switching process for the switching-destination multi-interface device, and thus communication with the external network becomes available through the switching-destination multi-interface device promptly after the completion of the path switching. Further, even if plural terminals exist, the switching-destination multi-interface device can establish a link with the corresponding terminal only, thus reducing a processing load on the switching-destination multi-interface device and promoting effective use of its resource.

The path switching method according to the ninth aspect of the present invention is one in which the second multi-interface communication device sends out a self information notice and a connection completion notice when both connections to the external network and to the terminal are completed.

This process allows the switching-origin multi-interface communication device to instruct the terminal to switch the relay destination.

The path switching method according to the tenth aspect of the present invention is one in which the terminal specified by a terminal identifier is specified from those registered in the neighbor cache or ARP (Address Resolution Protocol) cache of the first multi-interface communication device.

This method allows the switching-origin multi-interface communication device to specify a terminal with the latest communication record from address information for a node (terminal and multi-interface device) on a link managed by the neighbor cache or the like defined by IETF RFC2461, which dispenses with extracting a relay flow and performing historical management again, thus reducing a processing load on the multi-interface device and promoting effective use of its resource. This method utilizes the characteristics in that if an access to a node is not acknowledged for a certain period, the entry for the node is deleted from the neighbor cache. A neighbor cache is suitable for specifying a terminal with the latest communication record.

The path switching method according to the eleventh aspect of the present invention has a step in which the second multi-interface communication device sends out a connection possibility notice for notifying the first multi-interface communication device of connection possibility when the state of the possibility of connection with an external network changes; a step in which the first multi-interface communication device, when receiving "connection possible", stores information of "connection possible" of the second multi-interface communication device, included in the connection possibility notice, and when receiving "connection impossible", deletes information of "connection possible" of the second multi-interface communication device; and a step in which the first multi-interface communication device, when sending out a connection instruction, determines the sending-out destination according to the information on the possibility of connection of the second multi-interface communication device.

These steps allow the switching-origin multi-interface communication device to monitor the state of connection of individual multi-interface devices with the external network in real time, particularly "connection possible", and thus enable to accurately select a switching-destination multi-interface device suitable at any given time.

The path switching method according to the twelfth aspect of the present invention is one in which a connection possibility notice includes the identifier of a multi-interface communication device and the communication performance with the external network, and the first multi-interface communication device determines as the sending-out destination of a connection instruction, a connectable multi-interface communication device having communication performance suitable for the property of the relay flow, in communication with the external network.

The method allows the switching-origin multi-interface communication device to select a switching-destination multi-interface device according to the property of the current relay flow, thus preventing a failure of the relay flow due to path switching.

The multi-interface communication device according to the thirteenth aspect of the present invention is a multi-interface communication device having plural communication interfaces, that includes a connection management unit that detects at least any one of a deteriorated state of connection with the external network, a self shutdown, a reception of a switching request for changing the connection with the external network with another multi-interface communication device; a path management unit that notifies another multi-interface communication device on the local network on which the original multi-interface communication device is connecting, of an instruction for connecting with the external network and the identifier for specifying a terminal registered in the neighbor cache or ARP cache, responding to a detection notice; a receiving unit that receives a notice for completion of connection with the external network, from the multi-interface communication device that is the destination of the connection instruction notice; and a path switching instructing unit that notifies the local network of a path switching instruction for instructing switching of a multi-interface communication device to be used for relaying, responding to a connection completion notice from the receiving unit.

This makeup allows the multi-interface device providing a relay function to notify a switching-destination device able to provide a relay function, of a solicitation for takeover of relaying and information on a terminal requiring relaying, thus enabling the solicited multi-interface device to execute a switching process for the external link and the terminal simultaneously.

The multi-interface communication device according to the fourteenth aspect of the present invention features that an identifier notified by the path management unit is that of a terminal at the end of the flow relayed in a given time period.

This feature allows the multi-interface device from which a takeover for relaying has been solicited, to learn a terminal that has performed communication to the external link most recently, thus enabling preliminarily connecting to a terminal with a high possibility of requiring relaying.

The multi-interface communication device according to the fifteenth aspect of the present invention features that the path management unit sends out request parameters showing communication quality (QoS) and communication performance according to the property of a communication flow being relayed, along with a connection instruction.

This feature allows the multi-interface device from which a takeover for relaying has been solicited, to judge whether or not the device can provide the required communication quality and the like.

The multi-interface communication device according to the sixteenth aspect of the present invention features that the receiving unit receives a connection instruction reply for notifying of disconnection with an external network, from the multi-interface communication device that is a destination of a connection instruction notice; and the path management unit sends out a connection instruction to a multi-interface communication device that is a different destination, responding to a connection instruction reply notice from the receiving unit.

This feature allows the multi-interface communication device providing a relay function to specify a relay destination in sequence starting from one conforming to the communication conditions.

The multi-interface communication device according to the seventeenth aspect of the present invention features that the receiving unit receives a notice of possibility of connection with an external network, from another multi-interface communication device on the local network; and the path switching unit, when receiving "connection possible" from the receiving unit, stores an identifier for specifying the multi-interface communication device that is the transmission origin of the connection possibility notice, and when receiving "connection impossible", deletes the stored identifier for specifying the transmission-origin multi-interface communication device, and selects a sending-out destination of the connection instruction, from the stored identifiers.

This feature allows the multi-interface communication device providing a relay function to select another multi-interface device suitable for taking over when detecting that relaying is to be disabled.

The multi-interface communication device according to the eighteenth aspect of the present invention features that the connection possibility notice for notifying another multi-interface communication device includes the possibility of connection with an external network, an identifier for specifying the self, and the capacity of communication with the external network; and the path switching unit determines a multi-interface communication device with its communication capacity suitable for the property of the relay flow, as a sending-out destination for the connection instruction, according to the connection possibility notice.

This feature allows the multi-interface communication device providing a relay function to judge whether or not the conditions required for communication are satisfied.

The multi-interface communication device according to the nineteenth aspect of the present invention features that the path management unit sends out an instant notice solicitation for soliciting for instantly sending out a connection possibility notice, connection instruction reply, and connection completion notice.

This feature allows the multi-interface communication device to acquire required information in real time with another multi-interface device specified.

The multi-interface communication device according to the twelfth aspect of the present invention is one in which the path switching instructing unit stops sending out a path switching instruction if receiving a path switching instruction from the multi-interface communication device that is the notice destination for the connection instruction before the receiving unit receives a connection completion notice.

This method prevents a path switching instruction to be sent out redundantly.

The multi-interface communication device according to the twenty-first aspect of the present invention is one having plural communication interfaces, that includes: an instruction receiving unit that receives a notice for an instruction of connection with an external network and for the identifier specifying a terminal on the local network; an external link processing unit for performing a process for connecting to an external network; an internal link processing unit for performing a process for connecting to the terminal the identifier of which has been notified; and a connection notifying unit that sends out a connection completion notice for notifying of connection completion, to the multi-interface communication device as the transmission origin of the connection instruction, and sends out a self information notice for notifying of self network information to the local network.

This makeup allows the multi-interface device that receives a solicitation for takeover of a relay function to notify the multi-interface device as the solicitation origin of the condition of being able to perfectly take over a relay function.

The multi-interface communication device according to the twenty-second aspect of the present invention, further has a connection detecting unit for detecting the possibility of connection with an external network, and is one in which the external link processing unit and the internal link processing unit starts a connection process, responding to a detection notice of "connection possible" from the connection detecting unit; and the connection notifying unit sends out a connection instruction reply for notifying the multi-interface communication device as the transmission origin of the connection instruction, of starting of a process for connecting with the external network, responding to a detection notice of "connection possible" from the connection detecting unit.

This method allows the multi-interface device as the solicitation origin to monitor the communication performance and the like of the solicitation-destination multi-interface device at an early stage of the relay switching process.

The multi-interface communication device according to the twenty-third aspect of the present invention features that the instruction receiving unit further notifies the connection detecting unit of request parameters showing communication quality (QoS) and communication performance when received; and the connection detecting unit detects whether or not the requirements given by the request parameters are satisfied by the external network as the connection target.

This feature allows the multi-interface device that receives a solicitation for takeover of a relay function to notify the solicitation-origin multi-interface device of whether or not the requirements are satisfied.

The multi-interface communication device according to the twenty-fourth aspect of the present invention features that the connection notifying unit sends out a connection instruction reply for notifying the multi-interface communication device as the transmission origin of the connection instruction, of disconnection with the external network, responding to a detection notice of "connection impossible" from the connection detecting unit.

This feature allows the solicitation-origin multi-interface device to learn the possibility of communication of the solicitation-destination multi-interface device.

The multi-interface communication device according to the twenty-fifth aspect of the present invention features that the connection detecting unit always monitors the possibility of connection with the external network and notifies the connection notifying unit when the state of the connection possibility changes, and the connection notifying unit sends out a connection possibility notice for notifying connection possibility, to another multi-interface communication device on the local network, responding to the notice.

This feature allows the multi-interface communication device to monitor the state of connection of another multi-interface communication device with the external network, particularly the connection possibility.

The multi-interface communication device according to the twenty-sixth aspect of the present invention features that a connection possibility notice for notifying the condition of connection with the external link includes the possibility of connection with the external network, the identifier for specifying the self, and the capacity of communication with the external network.

This feature allows the multi-interface communication device to judge whether or not another multi-interface device conforms to conditions required for communication.

The multi-interface communication device according to the twenty-seventh aspect of the present invention features that the connection notifying unit, if having received a connection possibility notice, connection instruction reply, and an instant notice solicitation for soliciting for instantly sending out a connection completion notice, sends out the notices to the solicitation-origin multi-interface communication device instantly when generating the relevant message.

This feature allows the solicitation-origin multi-interface device to learn the state of a connection process of the solicitation-destination multi-interface device without delay, enabling takeover of a relay function without time loss.

The multi-interface communication device according to the twenty-eighth aspect of the present invention is one in which the connection notifying unit, after or instead of sending out a connection completion notice, notifies the local wireless network of a path switching instruction for instructing to switch the multi-interface communication device for relaying, on behalf of the multi-interface communication device as the transmission origin for the connection instruction.

This method allows the multi-interface communication device to notify a node on the local wireless network of a path switching instruction earlier than sending out the path switching instruction.

The terminal according to the present invention includes: a receiving unit that receives a connection request from an unconnected multi-interface communication device and a path switching instruction for instructing path switching from a connected multi-interface communication device to another; and a connection management unit that executes a process for connecting with the request-origin multi-interface communication device according to a connection request notified from the receiving unit, and switches the relay destination to the connected multi-interface communication device according to the path switching instruction.

With this makeup, the terminal is requested for establishing connection from the multi-interface device as a switching destination for relaying, thus reducing time loss when switching the relay destination to its relevant multi-interface device.

As described above, according to the present invention, when a multi-interface device that has been providing a relay function cannot continue relaying in a wireless network, the relay node can be rapidly switched from its relevant multi-interface device to another. This reduces packet loss in switching to allow utilizing network resources efficiently.

BRIEF DESCRIPTION OF DRAWINGS

FIG. 12 illustrates the structure of a connection possibility notice message according to the first embodiment of the present invention.

FIG. 13 illustrates the structure of a connection request message according to the first embodiment of the present invention.

FIG. 14 illustrates the structure of the list of QoS levels according to the first embodiment of the present invention.

FIG. 17 illustrates the first structure of an event management table according to the first embodiment of the present invention.

FIG. 18 illustrates the second structure of the event management table according to the first embodiment of the present invention.

REFERENCE MARKS IN THE DRAWINGS

Figure 1:
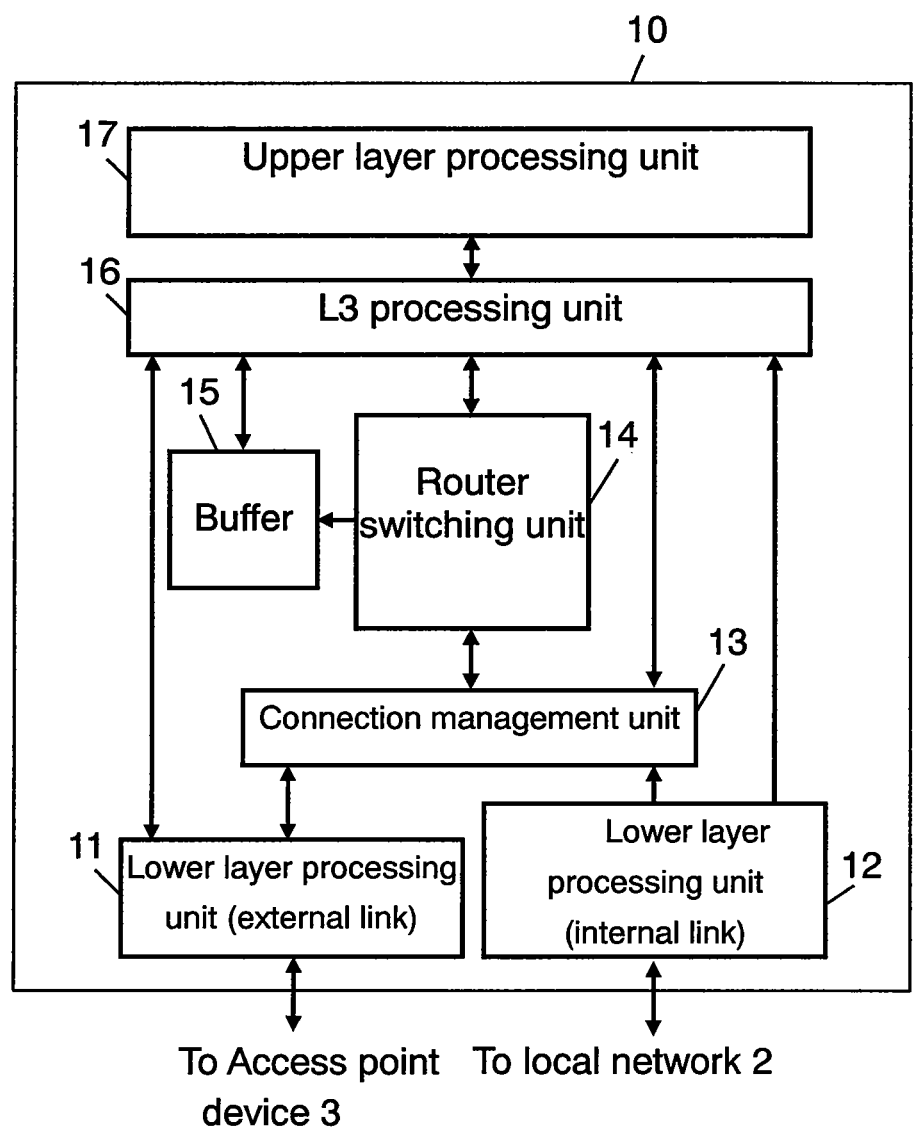
FIG. 1 illustrates the makeup of a router according to the first exemplary embodiment of the present invention.

1 External network
2 Local wireless network
3, 3a, 3b Access point device
10, 10a, 10b Router
11, 12 Lower layer processing unit
13 Connection management unit
14 Router switching unit
15 Buffer
16 L3 processing unit
17 Upper layer processing unit
20 Wireless terminal
21 Lower layer processing unit
22 Connection management unit
23 L3 processing unit
24 Upper layer processing unit
30 Multi-interface communication terminal
40 External terminal
51 SDP
52 BNEP
53 L2CAP
54 HCl
55 Base band
90 Router information management table
100 Event management table

DETAILED DESCRIPTION OF PREFERRED EMBODIMENTS

Hereinafter, a description is made for embodiments of the present invention using the related drawings.

First Exemplary Embodiment

Figure 3:
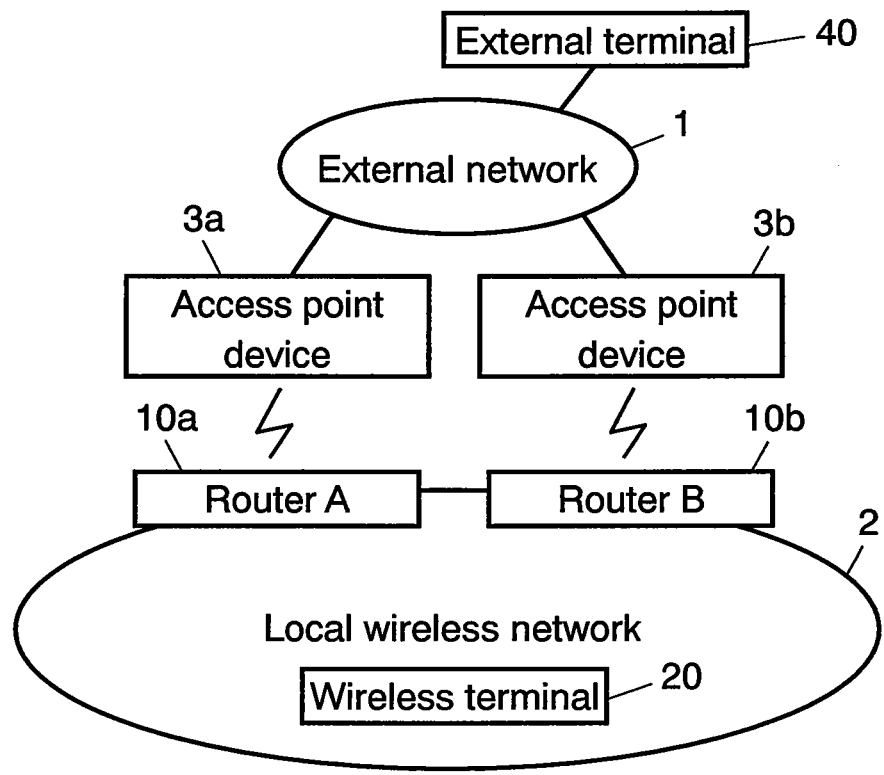
FIG. 3 illustrates the makeup of a communication system according to the first embodiment of the present invention.

FIG. 3 illustrates the makeup of a communication system according to the present invention, where routers 10a, 10b and wireless terminal 20 communicate with each other wirelessly to compose local wireless network 2. External network 1 such as the Internet has access point devices 3a, 3b and external terminal 40 connected thereto. Routers 10a, 10b connect to access point devices 3a, 3b through an access line by wireless communication.

In the communication system with the above-described makeup, wireless terminal 20 communicates with external terminal 40 through router 10a. After that, router 10a detects that the communication link can possibly be disconnected due to a deteriorated state of communication between router 10a and access point device 3a. Router 10a solicits another router 10b on local wireless network 2 for takeover of the communication related to wireless terminal 20. Router 10b, responding to the solicitation, establishes a communication link with access point device 3b to take over the relaying of communication related to wireless terminal 20.

Here, access point devices 3a, 3b could be a communication device that routers 10a, 10b can access for communicating with external network 1, and not particularly limited to an access point in a wireless LAN system. That is, access point devices 3a, 3b may be base-station devices in a cellular system.

Next, a description is made for the makeup and operation of each device using the related drawings.

FIG. 1 is a block diagram of router 10 according to the present invention.

In FIG. 1, lower layer processing unit 11 executes a physical layer process and a data link layer process, and connects to a wireless access link to access point device 3. Lower layer processing unit 12 connects to local wireless network 2 communicating wirelessly with wireless terminal 20.

Connection management unit 13 manages connection conditions of lower layer processing units 11, 12. Connection management unit 13 creates event management table 100 to send out messages to specified processing units inside or other devices in accordance with event occurrences.

FIGS. 17, 18 illustrate the makeup of event management table 100, where event type 101 shows the type of an event occurring; delivery destination 102, the destination of message transmission; local delivery destination 103, a processing unit as a delivery destination in the self device; and event transmission origin 104, a transmission origin that has notified of an event. Here, the delivery destination of "00:00:00:00:00:00" shows the self device, where event transmission origin 104 is not necessarily required.

Figures 15, 16:
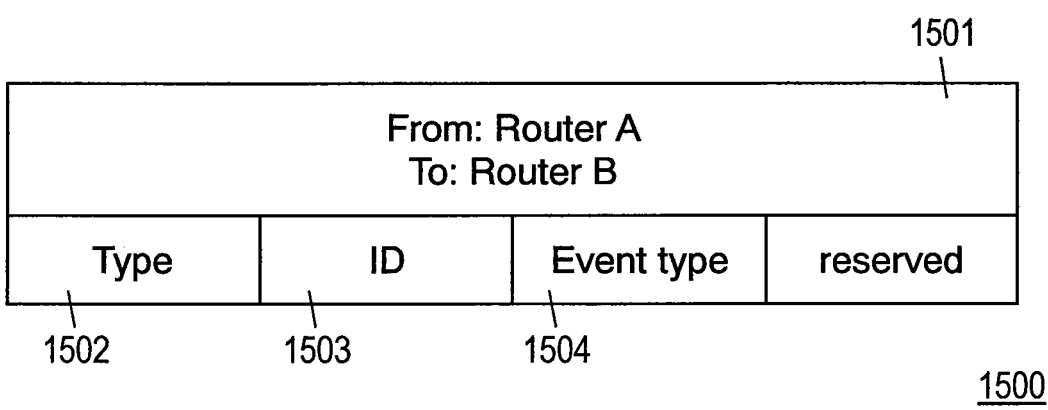
FIG. 15 illustrates the structure of a router information management table according to the first embodiment of the present invention.
FIG. 16 illustrates the structure of a notice registration message according to the first embodiment of the present invention.

Router switching unit 14 creates router information management table 90 to manage routers on local wireless network 2, and then determines a router as the switching-destination of relaying on the basis of router information management table 90 and generates an instruction for router switching. Further, router switching unit 14, when receiving an instruction for router switching from another router, instructs lower layer processing units 11, 12 to connect with the external network. FIG. 15 illustrates the makeup of router information management table 90. In FIG. 15, router address 91 shows the address of a router on local wireless network 2; QoS level 92, the level (shown in FIG. 14) of the communication quality of the corresponding router; bandwidth 93, the communication bandwidth that the corresponding router can provide.

Buffer 15 temporarily saves forwarding packets to another router generated when switching a router; L3 processing unit 16 executes a network layer process; and upper layer processing unit 17 executes higher layer process including transport layer.

Here, lower layer processing unit 11 can be applied with methods based on wireless communication standards such as wide-area wireless communication methods (e.g. cellular, PHS, IEEE 802.16, IEEE 802.20), and short-range wireless communication methods (e.g. Bluetooth (registered trademark), UWB, IEEE 802.11), and those based on wired communication standards (e.g. Ethernet (registered trademark)).

Meanwhile, lower layer processing unit 12 can be applied with methods based on wireless communication standards such as short-range wireless communication methods (e.g. Bluetooth (registered trademark), UWB, IEEE 802.11), and those based on wired communication standards (e.g. Ethernet (registered trademark)).

Figure 19:
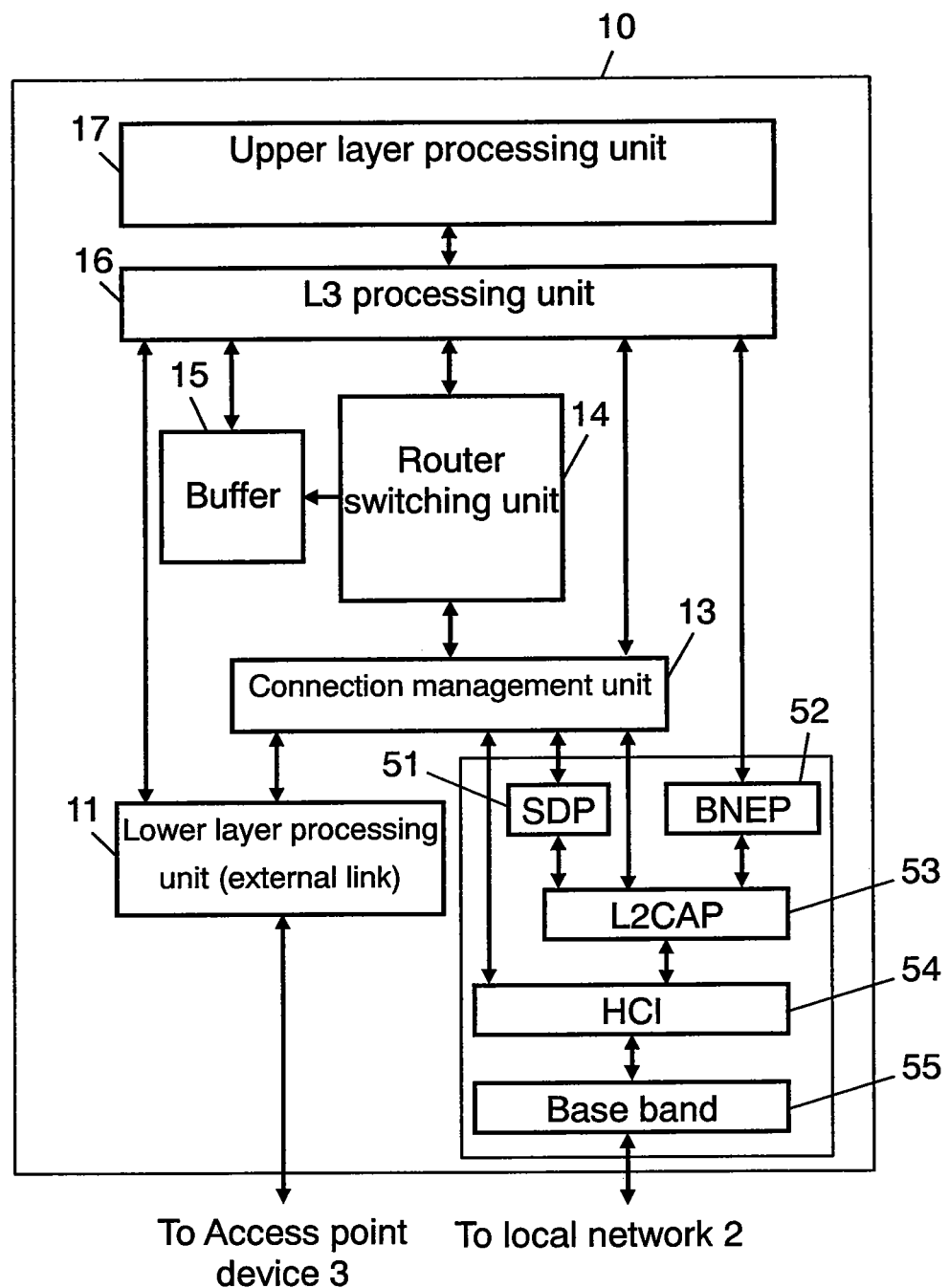
FIG. 19 illustrates the second structure of the router according to the first embodiment of the present invention.

FIG. 19 illustrates the makeup of router 10 with Bluetooth (registered trademark) (especially the PAN profile) applied as lower layer processing unit 12. In FIG. 19, connection management unit 13 connects with HCl (Host-Controller Interface) 54 of the Bluetooth stack to control connection and disconnection of a link according to the Bluetooth SIG standard, and acquires a link state notice (link event) such as link establishment (link up) and link disconnection (link down). Connection management unit 13 connects with SDP (Service Discovery Protocol) 51 as well to detect the presence of a terminal loaded with Bluetooth (registered trademark) in the vicinity and to acquire information such as the attribute and capability of the terminal detected.

This process enables determining the possibility of link connection. Connection management unit 13, for example, when detecting that connection with a terminal having an attribute of connection possible, generates "link detection event" to be described later to issue it to router switching unit 14, L3 processing unit 16, and others. Connection management unit 13 connects to L2CAP (Logical Link Control and Adaptation Protocol) 53 as well to send/receive various types of messages used in this embodiment. L3 processing unit 16 connects with BNEP (Bluetooth (registered trademark) Network Encapsulation Protocol) 52 to send/receive IP packets.

Here, connection management unit 13 corresponds to the connection management unit and connection detecting unit according to the present invention, and router switching unit 14 corresponds to the path management unit, path switching instructing unit, and connection notifying unit according to the present invention. Lower layer processing unit 12 and L3 processing unit 16 correspond to the receiving unit and instruction receiving unit for various types of messages according to the present invention, and especially lower layer processing unit 12 corresponds to the internal link processing unit according to the present invention as well. Lower layer processing unit 11 corresponds to the external link processing unit according to the present invention as well.

Hereinafter, a description is made for the basic operation of router 10 with the above-described makeup.

The packet processing of router 10 in this embodiment is as follows.

A frame received from local wireless network 2, after undergoing a physical layer protocol process and a data link layer protocol process by lower layer processing unit 12, undergoes an IP protocol process including a routing process by L3 processing unit 16, to be transferred to lower layer processing unit 11 or 12 at any one side. A packet received from external network 1 through access point device 3a, after undergoing a physical layer protocol process and a data link layer protocol process by lower layer processing unit 11, is as well transferred to lower layer processing unit 11 or 12 at any one side by a routing process in L3 processing unit 16.

L3 processing unit 16 describes information on the network and on router 10 itself in a Router Advertisement message defined by IETF RFC2461 (Neighbor Discovery for IPv6) and sends it out to local wireless network 2 regularly or according to a solicitation from wireless terminal 20 connected to local wireless network 2.

Next, a description is made for the operation of a notice of the connectivity with an external link performed by router 10.

First, connection management unit 13 of each router 10 on local wireless networks 2, when detecting that lower layer processing unit 11 can establish (or has established) an external link with access point device 10, sends out a connection possibility notice message to local wireless network 2 through lower layer processing unit 12.

FIG. 12 illustrates the format of connection possibility notice message 1300 having at least address field 1301, message type field 1302, message ID field 1303, status field 1304, offered QoS level field 1305, and offered bandwidth field 1306.

In FIG. 12, address field 1301 shows a source address and destination address; message type 1302 specifies the type of a message; message ID 1303 is an identifier for specifying a message; and status field 1304 shows the connection condition. The connection condition has '0' for indicating connection impossible and '1' for connection possible to be set. Offered QoS level 1305 shows the performance of QoS shown in FIG. 14, and offered bandwidth 1306 shows the bandwidth of communication with an external link.

Here, by specifying different message types, a message for notifying that an external link can possibly be established may be distinguished from that for showing that an external link has been established. Doing so enables a node that has received connection possibility notice message 1300 to promptly judge whether or not time for establishing an external link is available.

Specifically, connection management unit 13 describes the L2 address allocated to its own lower layer processing unit 12 to the source address in address field 1301; and a multicast address or broadcast address that reaches all the routers, to the destination address. When router 10 to be a destination can be specified, the L2 address of the router 10 may be described.

Connection management unit 13 further describes an identifier for specifying being a connection possibility notice message in message type field 1302, and an identifier for specifying a message in message ID field 1303. Connection management unit 13 describes '1' for indicating connection possible in status field 1304; a value of QoS level 81 conforming to QoS performance 82 offered by an external link that lower layer processing unit 11 as a target connects with, in offered QoS level field 1305; and a communication bandwidth value of the external link, in offered bandwidth field 1306 as well.

Next, in router 10 on local wireless network 2, connection management unit 13, when receiving connection possibility notice message 1300 sent out from router 10, other than itself, through lower layer processing unit 12, notifies router switching unit 14 of information described in each field. Router switching unit 14 creates router information management table 90 according to the information notified. More specifically, router switching unit 14 describes the source address of address field 1301 in router address 91; the value of offered QoS level field 1305, in QoS level 92; and the value of offered bandwidth field 1306, in bandwidth 93.

Meanwhile, router 10 always monitors the connection condition of the external link of lower layer processing unit 11 and, when detecting that the connection with the external link becomes impossible, sends out connection possibility notice message 1300 with '0' indicating connection impossible described therein, to status field 1304 at the time. Then, connection management unit 13 of another router 10 that has received this message transfers a notice of connection impossible to router switching unit 14. Router switching unit 14, responding to the notice, deletes the corresponding entry in router information management table 90. This process allows router 10 to always manage the condition of connection with the external link of another router. Router 10 especially operating as a default router, when detecting the possibility of its own external link disconnected, can specify a router possible to establish an external link or router 10 already having established an external link, as a switching-destination router.

In the above description, connection possibility notice message 1300 has status field 1304, but not limited. Instead of status field 1304, individual messages for notifying of connection possible and impossible can be provided.

By adding a field in which the identifier of lower layer processing unit 11 is described in connection possibility notice message 1300 and additionally a field in which the same identifier is described in router information management table 90 as well, the identifier of lower layer processing unit 11 that has been detected as connection possible (or that has lost connection possibility) may be sent to router 10 on local wireless network 2.

This process allows the switching-origin router to manage connection conditions of each lower layer processing unit 11, if router 10 has plural lower layer processing units 11 for connecting with external network 1 (e.g. cellular interface and wireless LAN interface), and thus lower layer processing unit 11 conforming to the QoS requirements can be specified for the switching-destination router.

Determining a switching destination only by information of connection possible or impossible, without especially providing a field into which information on the offered QoS level and offered bandwidth are transferred in connection possibility notice message 1300, improves the message transfer efficiency and the process efficiency in router 10.

Next, a description is made for the operation of router switching process in router 10 using the related drawings.

Figure 6:
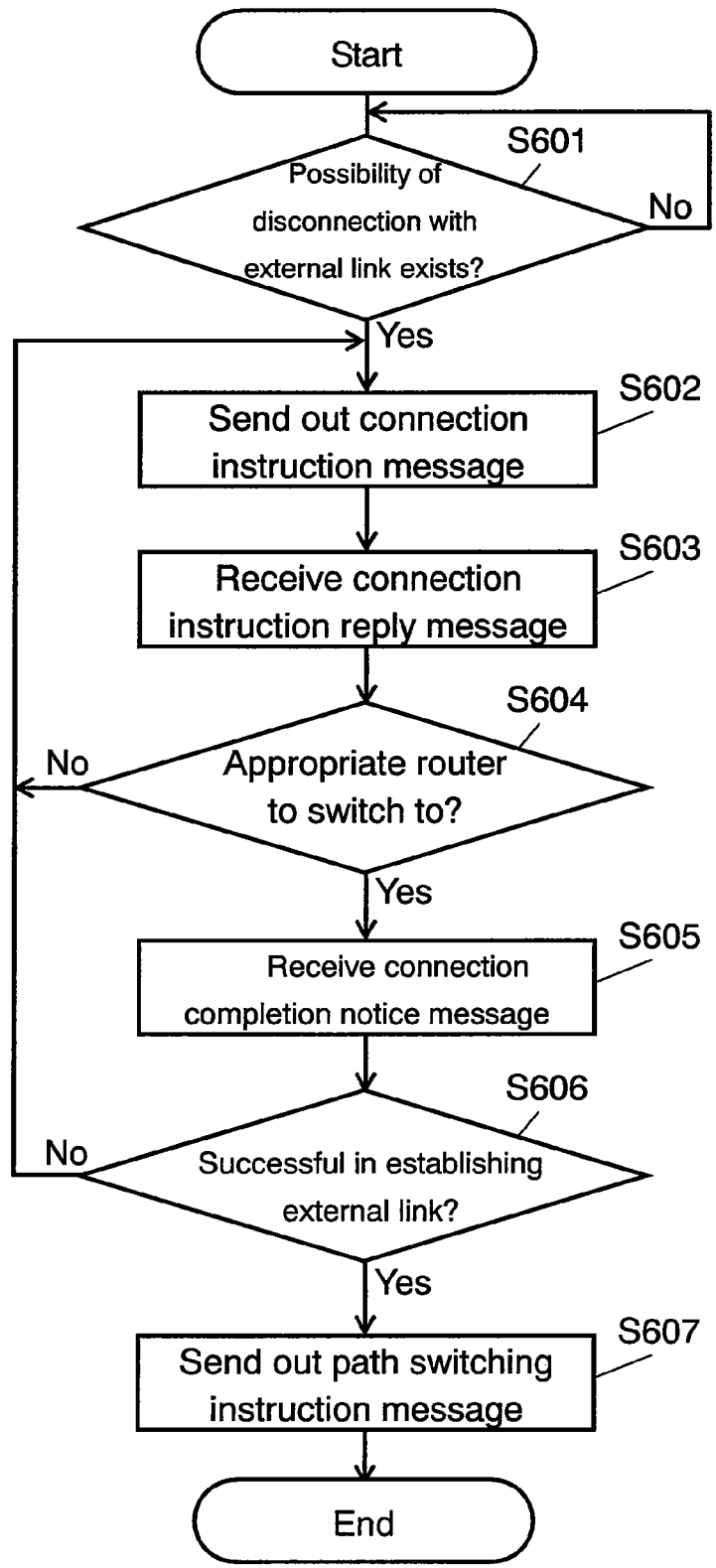
FIG. 6 is a flowchart showing an operation example of a switching-origin router according to the first embodiment of the present invention.

FIG. 6 is a process flowchart illustrating the operation of the router switching process of a switching-origin router according to the embodiment. Here, router 10 that starts a series of router switching process is referred to especially as router A (10*a*) (or switching-origin router 10*a*), and router 10 specified as a switching destination by router A (10*a*) is referred to especially as router B (10*b*) (or switching-destination router 10*b*).

Firstly, a description is made for the operation of router switching process in router A (10*a*).

First, connection management unit 13 notifies router switching unit 14 of the possibility of disconnection with an external link, when detecting a deteriorated state of connection of the communication link (referred to as "external link" hereinafter) between lower layer processing unit 11 and access point device 3*a*, when detecting that connectivity to a packet-forwarding destination is lost, or when receiving an explicit request for disconnection of a communication link from a user, upper layer processing unit 17, or the like, for the purpose of shutting down of the device or others (step S601).

Here, the connection state of the external link can be asynchronously notified from lower layer processing unit 11 when connection management unit 13 acquires the conditions from lower layer processing unit 11 periodically or as required, or when the connection conditions change as a result that connection management unit 13 registers the conditions in lower layer processing unit 11 beforehand. The connection conditions of the external link are normally judged by the changes in the intended intensity of received electric field, bit error rate, and the like, that have been measured.

For example, connection management unit 13 judges a deteriorated state of connection by observing a decrease of the received signal strength, and judges that further communication is impossible when the strength falls below a level required for ensuring a given communication quality, to detect possibility of disconnection.

Connection management unit 13 detects connectivity with a packet-forwarding destination by acquiring the result (e.g. presence or absence of a ping reply by L3 processing unit 16) of arrival confirmation by L3 processing unit 16 or upper layer processing unit 17, periodically or as required, or by receiving a notice from L3 processing unit 16 or upper layer processing unit 17 asynchronously.

Here, switching-origin router A (10*a*) may detect the possibility of disconnection with the external link on the condition that router A (10*a*) has received a switching solicitation from another router 10, a user, or an upper layer processing unit. This case is useful when router 10 with better communication conditions is desired as a relay path although the external link of switching-origin router A (10*a*) is not deteriorated. Here, a switching solicitation by another router 10 can be made using message type information indicating a switching solicitation and a switching solicitation message including a source address.

Next, router switching unit 14 selects as a switching destination, router 10 having an external link that will minimize the deterioration of the quality of a communication flow (referred to as "relaying flow" hereinafter) with which relaying is currently performed, due to switching from current lower layer processing unit 11, out of router information managed by router information management table 90. Then, router switching unit 14 notifies connection management unit 13 of the L2 address, required QoS, and required bandwidth value, and connection management unit 13 generates connection instruction message 1000 as follows.

Figure 9:
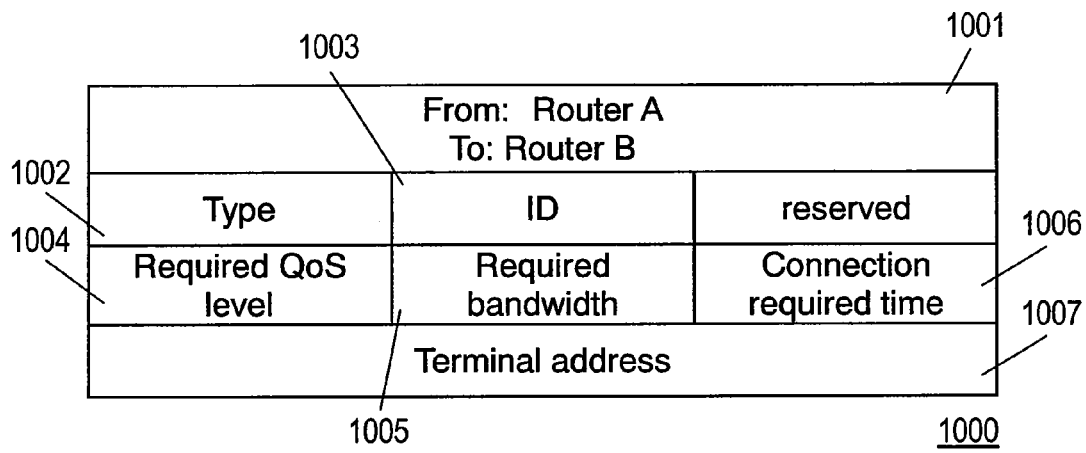
FIG. 9 illustrates the structure of a connection instruction message according to the first embodiment of the present invention.

FIG. 9 illustrates the format of connection instruction message 1000, having address field 1001 showing the source and destination address of the message, message type field 1002, message ID field 1003, required QoS level field 1004, required bandwidth field 1005, connection required time field 1006, and terminal address field 1007.

In FIG. 9, message type 1002 specifies the type of a message; message ID 1003 is an identifier for specifying a message; required QoS level 1004 is the level of the QoS performance shown in FIG. 14; required bandwidth 1005 shows a communication bandwidth to be required; connection required time 1006 shows the expected time until the external link to which the self is connected is disconnected; and terminal address 1007 shows the address of a terminal during relaying or registered in the neighbor cache or ARP cache. Here, the information described in required QoS level field 1004 and required bandwidth field 1005 is referred to especially as "QoS requirement parameter."

Connection management unit 13 describes in the address field 1001 the L2 address allocated to lower layer processing unit 12 of the self (router A (10*a*)) as a source address (From:); and the L2 address allocated to lower layer processing unit 12 of router B (10*b*) to be a switching destination as the destination address (To:). Here, connection instruction message 1000 may be further provided with the identifier of router A (10*a*). This makeup causes plural lower layer processing units 12 to connect with local wireless network 2, allowing router A (10*a*) to be uniquely identified independently of the source L2 address even if plural paths are available for external terminal 40 at the other end of communication.

Subsequently, connection management unit 13 describes an identifier for specifying connection instruction message 1000 in message type field 1002; and an identifier for specifying the message itself, in message ID field 1003. The unit further describes level value 81 of QoS performance 82 to be required, in required QoS level field 1004 according to QoS level list 80; and a bandwidth value (e.g. 10 Mbps) to be required, in required bandwidth field 1005 as well. Here, a QoS performance value corresponding to the QoS performance of lower layer processing unit 11 and a communication bandwidth value are described in required QoS level field 1004 and required bandwidth field 1005, respectively. Each value may be based on either the nominal value in the service or the actual value in lower layer processing unit 11.

Alternatively, in order to extract more detailed QoS performance, router switching unit 14 acquires information on whether or not a relay flow exists, from L3 processing unit 16 or lower layer processing units 11, 12, and if the QoS performance required by the relay flow is definite, router switching unit 14 may extract required QoS performance from the QoS performance.

In L3 processing unit 16, for example, monitoring the receive time interval and packet size of relay packets allows the packet relay rate to be calculated, a desired communication bandwidth value to be extracted, and the necessity of real-time relaying to be judged by the change of the receive time interval of relay packets.

Further, L3 processing unit 16 specifies whether or not the relay destination of relay packets is local wireless network 2, and monitors the relay flow property for up and down individually to accurately extract a QoS performance value to be required.

Monitoring a relay flow for individual wireless terminals 20, ports used by TCP/UDP or the like, or applications, enables more suitable QoS performance to be extracted.

Subsequently, connection management unit 13 describes an expected time (e.g. 3,000 millisecond) until the external link connected by its own lower layer processing unit 11 is disconnected, in connection required time field 1006. If the time required for a connection process does not need to be requested to switching-destination router 10, connection required time field 1006 does not especially need to be provided in connection instruction message 1000. Alternatively, a process at the receiving side may be omitted by preliminarily describing a given value for specifying that any process related to connection required time is not required, thus reducing a processing load.

Connection management unit 13 describes the L2 address of wireless terminal 20 terminating the flow that the self (router A (10*a*)) is relaying or has been relaying until recently, in terminal address field 1007. Alternatively, router switching unit 14 refers to the neighbor cache or ARP cache defined by IETF RFC2461 retained by L3 processing unit 16, to specify wireless terminal 20 already having a communication link. Then, router switching unit 14 notifies connection management unit 13 of the L2 address, and connection management unit 13 describes it in terminal address field 1007. Here, the neighbor cache includes information on, besides wireless terminal 20, router 10 as well.

In order to extract information only on wireless terminal 20 from the neighbor cache, the IP address of router 10 is acquired from a Router Advertisement message running on local network 2, and then the information is extracted from the neighbor cache with the IP address of router 10 removed (filtered).

If plural items need to be described in terminal address field 1007, connection management unit 13 provides plural terminal address fields 1007. If local wireless network 2 is made with Ethernet (registered trademark) or the like, and if explicitly establishing a communication link is definitely unnecessary in router switching between switching-destination router B (10*b*) and wireless terminal 20, connection instruction message 1000 does not need to provide terminal address field 1007. Moreover, if message exchanging is separately performed between router switching units 14 of router A (10*a*) and router B (10*b*) to notify of the address of wireless terminal 20, connection instruction message 1000 does not need to provide terminal address field 1007. If router switching unit 14 of router A (10*a*) makes connection management unit 13 issue connection request message 1400, to be described later, to separately instruct connection management unit 13 of router B (10*b*) to connect with wireless terminal 20, connection instruction message 1000 does not need to provide terminal address field 1007.

Connection instruction message 1000 thus generated is transmitted to a specified router on the local network through lower layer processing unit 12 (step S602). Connection instruction message 1000 may be generated and transmitted by router switching unit 14, not generated by connection management unit 13. If router 10 does not request for maintaining the QoS of the flow to be relayed, connection instruction message 1000 does not need to include required QoS level field 1004 or required bandwidth field 1005.

If router switching unit 14 cannot specify switching-destination router B (10*b*), connection management unit 13 describes a multicast address or broadcast address that reaches all routers, in the destination of address field 1001, to transmit connection instruction message 1000 to local wireless network 2.

Next, after sending out connection instruction message 1000, connection management unit 13, when receiving connection instruction reply message 1100 through lower layer processing unit 12, notifies router switching unit 14 (step S603).

Figure 10:
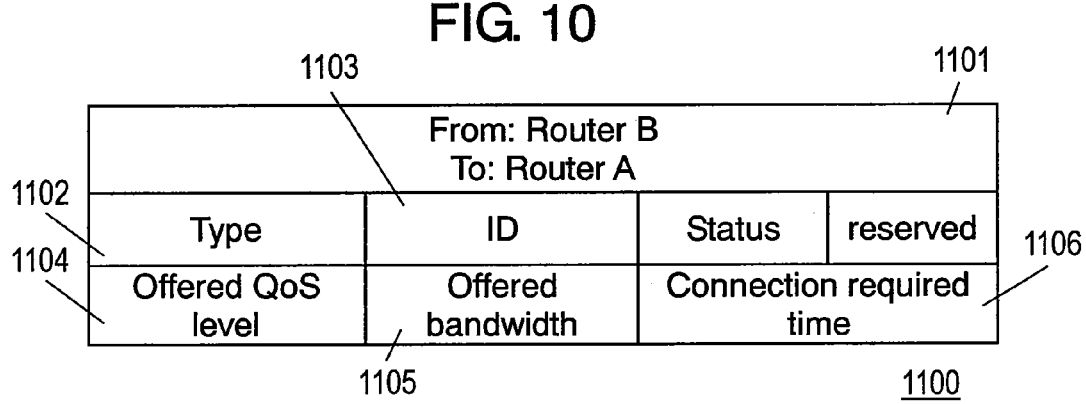
FIG. 10 illustrates the structure of a connection instruction reply message according to the first embodiment of the present invention.

FIG. 10 illustrates the format of connection instruction reply message 1100, including at least address field 1101, type field 1102, message ID field 1103, status field 1107, offered QoS level field 1104, offered bandwidth field 1105, and connection required time field 1106. Status 1107 shows the compatibility of connection with the external link, where '0' is described if compatible with required conditions; if unable to connect with the external link; and '2,' if incompatible with required conditions. Offered QoS level 1104 shows the communication quality that can be offered in the communication with the external link with the level values shown in FIG. 14.

At this moment, connection management unit 13 acknowledges the reply to connection instruction message 1000 sent out before from the fact that message ID field 1003 of connection instruction message 1000 is identical with message ID field 1103 of connection instruction reply message 1100. On that condition, connection management unit 13 transfers information (values) described in each field to router switching unit 14. Router switching unit 14, responding to the information, judges whether or not router B (10b) is suitable for a switching destination, by the value described in status field 1107 (step S604).

If the value of status 1107 is '0' indicating that an external link can be established and the required QoS performance is satisfied, for example, router switching unit 14 determines router B (10b) as a switching destination. Meanwhile, if the value of status 1107 is '1' indicating that an external link cannot be established; '2,' the required QoS performance is not satisfied although an external link can be established; or if the reply indicates that router B (10b) cannot be a switching destination for the other reasons, router switching unit 14 does not determine router B (10b) as a switching destination, but executes the process from step S602 again for another router 10.

Further, router switching unit 14 acknowledges the QoS level and bandwidth that router B (10b) can offer, from values described in offered QoS level field 1104 and offered bandwidth field 1105. Further, router switching unit 14, if the value of connection required time field 1106 exceeds the expected time until the external link of its own lower layer processing unit 11 is disconnected, does not determine router B (10b) as a switching destination, but resumes the process from step S602 for another router 10. Alternatively, router switching unit 14, even if the value of connection required time field 1106 exceeds the expected time until the external link of its own lower layer processing unit 11 is disconnected, if the self (router A (10a)) has a mechanism for buffering relay packets, omits evaluating values described in connection required time field 1106, on the assumption that relay packets after the external link is disconnected are buffered. Alternatively, router A (10a) may continue the process for determining router B (10b) as a switching-destination after calculating the buffer size required for buffering, for example.

Router switching unit 14, if the external link has been already disconnected, and L3 processing unit 16 temporarily accumulates relay packets whose source address is wireless terminal 20, in buffer 15, under the control of router switching unit 14, approximates an accumulative capacity to be required, from the reception frequency and size of relay packets, to manage resources efficiently.

If the time required for the connection process does not need to be presented from switching-destination router B (10b) to switching-origin router A (10a), connection required time field 1106 is not required. Alternatively, the process at the receiving side may be omitted by describing a given value indicating that any process related to the connection required time, in the connection instruction message. These arrangements reduce a processing load.

Connection management unit 13 may manage the reception wait state by setting an allowable wait time for router A (10a) to receive connection instruction reply message 1100. Reception of a message may be waited until lower layer processing unit 12 is disconnected or enters a dormant state, especially with the connection duration time of lower layer processing unit 12 employed as the allowable wait time.

Alternatively, connection management unit 13 may release the reception wait state of connection instruction reply message 1100 from the state of connection with router B (10b) in lower layer processing unit 12. Connection management unit 13 may detect that communication with router B (10b) is impossible, by means of the neighbor cache in IPv6 as defined by RFC2461 or ARP in IPv4 as defined by RFC826, to start a switching process for another router B (10b), for example.

Router switching unit 14 of router A (10a), if determining that router B (10b) is unsuitable for a switching destination, may instruct connection management unit 13 to send out a disconnection request message that instructs to disconnect the external link for which router B (10b) is executing a connection process, to router B (10b). At this moment, connection management unit 13 of router A (10a) sends out a disconnection request message according to an instruction from switching unit 14. Connection management unit 13 of router B (10b) that has received the message starts a process for disconnecting the external link for which a connection process is executed according to connection instruction message 1000 from router A (10a) received before. As a result that router A (10a) judges the possibility of connection with a switching-destination router in this way, the external link of router B (10b) that will turn out not to be used can be disconnected early, thus saving the communication cost of router B (10b) and wasteful power consumption.

Figure 11:
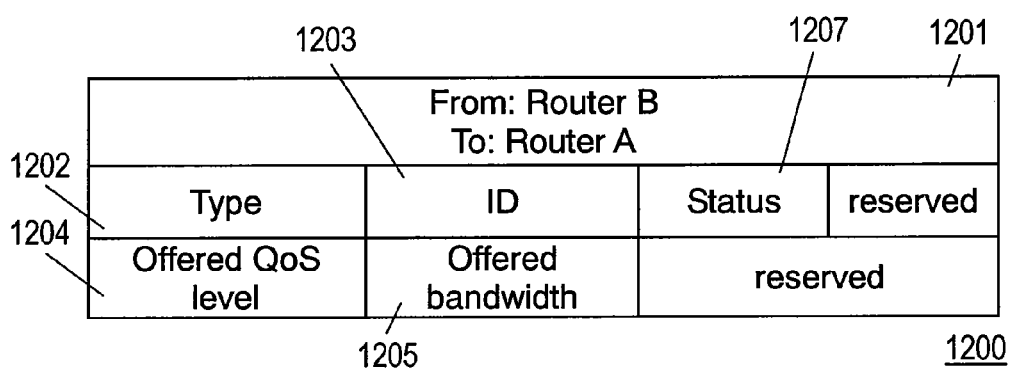
FIG. 11 illustrates the structure of a connection completion notice message according to the first embodiment of the present invention.

Next, connection management unit 13, when receiving connection completion notice message 1200 through lower layer processing unit 12, notifies router switching unit 14 (step S605). FIG. 11 illustrates the format of connection completion notice message 1200, including at least address field 1201, message type field 1202, message ID field 1203, status field 1207, offered QoS level field 1204, and offered bandwidth field 1205. Information in each field is basically the same as those in connection instruction reply message 1100 described before. However, status field 1207 shows whether or not an external link has been successfully established.

Next, router switching unit 14, referring to status field 1207 of connection completion notice message 1200 notified, judges whether or not router B (10b) has successfully established an external link (step S606). If unsuccessful, the process flow returns to step S602 for another router 10.

Next, router switching unit 14, when judging that switching-destination router B (10b) has completed establishing an external link, instructs L3 processing unit 16 to send out an Router Advertisement message with RL=0 as a path switching instruction message. L3 processing unit 16, responding to this message, sends out an Router Advertisement message to local wireless network 2 through lower layer processing unit 12 (step S607).

Here, connection management unit 13, if receiving connection completion notice message 1200 without receiving connection instruction reply message 1100, does not especially need to execute the above-described process when receiving connection instruction reply message 1100 described above.

Router switching unit 14, responding to the judgment that router B (10b) has been determined to be suitable as a switching destination (step S604), may instruct connection management unit 13 to transmit a connection request message so that wireless terminal 20 starts a process for connecting with a specific communication device (router B (10b) here). This process allows the connection between wireless terminal 20a and router B (10b) at a lower layer to be executed before the process for switching between router A (10a) and router B (10b) is completed, thus implementing a rapid switching process.

FIG. 13 illustrates the format of connection request message 1400, including at least address field 1401, type field 1402, message ID field 1403, and router address field 1404.

Connection management unit 13 acquires the addresses of wireless terminal 20 and router B (10*b*) from router switching unit 14. Connection management unit 13 further sets the transmission origin of address field 1401 to the address of the self (router A (10*a*)); and the destination, to the address of wireless terminal 20, describes the address of router B (10*b*) in router address field 1404, and sends them out through lower layer processing unit 12.

Here, router switching unit 14 does not issue an instruction to send out a path switching instruction message to L3 processing unit 16, if receiving from L3 processing unit 16, a receive notice for a path switching instruction message from router B (10*b*), before or immediately after router switching unit 14 receives a receive notice for connection completion notice message 1200 from connection management unit 13.

Here, whether or not the transmission origin of the above-described path switching instruction message (Router Advertisement message) is router B (10*b*) can be judged by comparing the layer 2 address of the message with that of router B (10*b*).

Figure 7:
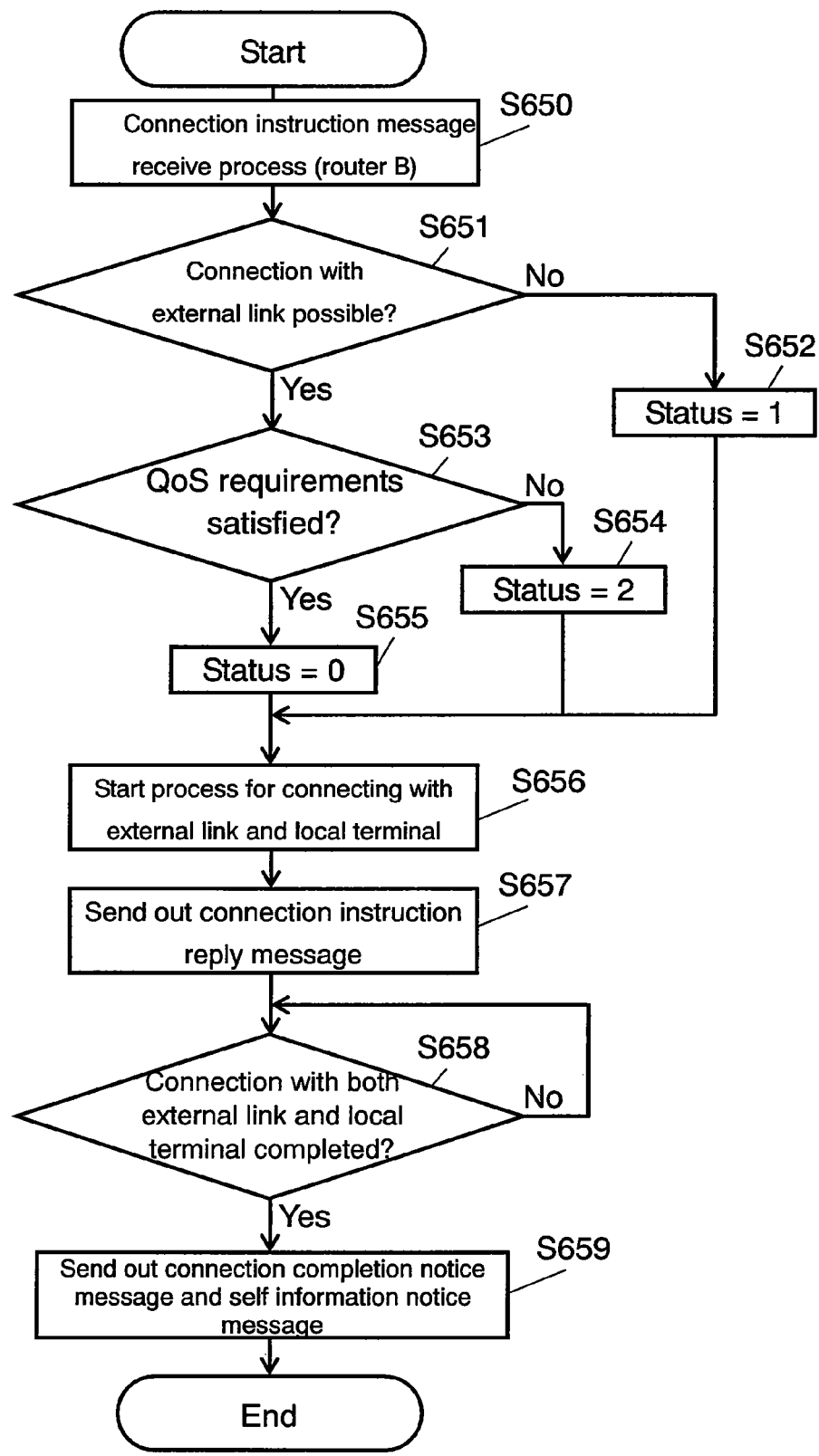
FIG. 7 is a flowchart showing an operation example of a switching-destination router according to the first embodiment of the present invention.

Next, a description is made for the operation of the router switching process in switching-destination router B (10*b*), using the operation flowchart of FIG. 7.

In FIG. 7, connection management unit 13 of router B (10*b*) first receives connection instruction message 1000 through lower layer processing unit 12 (step S650).

Lower layer processing unit 11 judges whether or not establishing an external link with access point device 3*b* is possible by the intensity of radio waves from access point device 3*b*, or whether information such as SSID or WEP key for the wireless LAN has been acquired (step S651).

Specifically, lower layer processing unit 11 acquires information on the network provided by access point device 3*b* from access point device 3*b* utilizing the control channel of the communication protocol. The connectivity can be monitored by judging the identity of SSID or by the other method, if the communication to access point device 3*b* uses the wireless LAN, for example. Alternatively, lower layer processing unit 11 may actually execute a process for connecting with access point device 3*b* to monitor the communication state.

Connection management unit 13, if receiving a notice of connection impossible from lower layer processing unit 11, determines the value to be described in status field 1107 of connection instruction reply message 1100 as '1' (step S652).

Here, in this process, connection management unit 13, responding to the reception of connection instruction message 1000, may notify router switching unit 14 of the message content, to instruct connection management unit 13 to judge the connectivity of lower layer processing unit 11 to the external link. In this case, router switching unit 14 notifies connection management unit 13 of a value to be described in connection instruction reply message 1100, and connection management unit 13 describes the value in connection reply message 1100.

In step S651, if the external link is connectable or already connected, connection management unit 13 further judges whether or not the requirements notified through required QoS level field 1004 and required bandwidth field 1005 of connection instruction message 1000 (step S653). Then, connection management unit 13 determines the value to be described in status field 1107 of connection instruction reply message 1100 as '2,' if the QoS level and communication bandwidth offered by lower layer processing unit 11 are lower than the required values (step S654).

Meanwhile, if judged that the external link can be established and the QoS requirements are satisfied, connection management unit 13 determines the value to be described in status field 1107 of connection instruction reply message 1100 as '0' (step S655). Here, in this process, connection management unit 13, responding to the reception of connection instruction message 1000, may notify router switching unit 14 of the message content to instruct connection management unit 13 to execute the process related to the required QoS and required bandwidth. In this case, router switching unit 14 notifies connection management unit 13 of a value to be described in connection instruction reply message 1100, and connection management unit 13 describes the value in connection reply message 1100.

Next, connection management unit 13, if unconnected with access point device 3*b*, instructs lower layer processing unit 11 to execute a connection (establishing an external link) process, and instructs lower layer processing unit 12 to execute a process for link connection with wireless terminal 20 of the address described in terminal address field 1007 of connection instruction message 1000 (step S656).

In this process, connection management unit 13, responding to the reception of connection instruction message 1000, notifies router switching unit 14 of the message content. Then, router switching unit 14 may instruct connection management unit 13 to start a process for link connection with lower layer processing unit 11 and with wireless terminal 20. Further, message exchanging may be executed between router switching units 14 of router A (10*a*) and router B (10*b*), to notify of the address of wireless terminal 20, separately from connection instruction message 1000. In the case, connection management unit 13 of router B (10*b*) notifies router switching unit 14 of the timing when instructing lower layer processing unit 11 to execute a link connection process, and router switching unit 14, responding to the notice, instructs connection management unit 13 to execute a process for link connection between wireless terminal 20 and lower layer processing unit 12.

Next, connection management unit 13 generates connection instruction reply message 1100 and sends it out (step S657). More specifically, connection management unit 13 sets the source of address field 1101 of connection instruction reply message 1100, to the address of the self (router B (10*b*)); and the destination, to the source address (router A (10*a*)) of connection instruction message 1000, and sets the value same as that in message ID field 1003 of connection instruction message 1000, to message ID field 1103. Connection management unit 13 further describes the value determined before in status field 1107; and the level and bandwidth that lower layer processing unit 11 can offer, in offered QoS level field 1104 and offered bandwidth field 1105. Connection management unit 13 further describes either (maximum value) an estimated time that lower layer processing unit 11 requires for establishing an external link with access point device 3*b*, or an estimated time that lower layer processing unit 12 requires for establishing a link with wireless terminal 20, in connection required time field 1105. Connection management unit 13, after performing the above-described setting, sends out the message to local wireless network 2 through lower layer processing unit 12.

Here, steps S656 and S657 are not necessarily executed in the order of the above description, but step S656 may be executed after step S657 (sending out connection instruction reply message 1100), or both steps may be executed simultaneously.

Next, connection management unit 13, responding to the completion of a process for link connection between lower layer processing unit 11 and its connection destination, and between lower layer processing unit 12 and its connection destination (step S658), sends out connection completion notice message 1200 (step S659). At this moment, connection management unit 13 sets the source in address field 1201 of connection completion notice message 1200, to the address of the self (router B (10b)); and the destination, to source address (router A (10a)) of connection instruction message 1000, and sets the value same as that in message ID field 1003 of connection instruction message 1000, to message ID field 1203. Connection management unit 13 further describes '0' indicating normal end if both connection processes have completed normally; an error value other than '0' if failed. Connection management unit 13 describes a level and bandwidth that lower layer processing unit 11 can offer, in offered QoS level field 1204 and offered bandwidth field 1205.

L3 processing unit 16, responding to a notice from connection management unit 13, sends out a Router Advertisement message to the local wireless network. This Router Advertisement message corresponds to a self information notice message for notifying of self network information according to the present invention. With this notice, wireless terminal 20 recognizes router B (10b) as a router that can relay and adds router B (10b) in the router list.

Thus, in order to attain the purpose of the present invention, connection management unit 13 needs to send out connection completion notice message 1200 responding to the completion of both process.

If wireless terminal 20 does not need to be connected, the process flow proceeds to step S659 at the moment when link connection at lower layer processing unit 11 completes.

Here, connection management unit 13 notifies router switching unit 14 of completion of transmission of connection completion notice message 1200, and router switching unit 14, responding to the notice, may instruct L3 processing unit 16 to send out a Router Advertisement message with RL=0 and an address of router A (10a) as its source address, as a path switching instruction message. Alternatively, connection management unit 13, responding to the completion of a process for link connection between lower layer processing unit 11 and its connection destination, and between lower layer processing unit 12 and its connection destination (step S658), may notify router switching unit 14 without transmitting connection completion notice message 1200, and router switching unit 14 may instruct L3 processing unit 16 to send out a Router Advertisement message with RL=0 and an address of router A (10a) as its source address, as a path switching instruction message.

If router switching unit 14 is notified of the address of wireless terminal 20 not with connection instruction message 1000 but with another special message, router switching unit 14 instructs lower layer processing unit 12 to separately execute a process for link connection with wireless terminal 20, through connection management unit 13. In this case, connection management unit 13, responding to the completion of connection with wireless terminal 20, separately transmits connection completion notice message 1200 to router A (10a). Then, the process flow of router A (10a) proceeds to S606 after receiving connection completion notice messages 1200 for both the completion of the external link at router B (10b) and the completion of connection with wireless terminal 20 on the internal link.

For this reason, connection completion notice message 1200 needs an additional field for identifying that the completion of connection is with an external link or a terminal. This identifying information may be an address to which it connects or the identifier of a lower layer processing unit that has executed link connection, for example.

Lower layer processing unit 12 may notify L3 processing unit 16 of the timing when link connection with wireless terminal 20 is completed, through connection management unit 13. Alternatively, the timing may be notified from connection management unit 13 to router switching unit 14 and from router switching unit 14 to L3 processing unit 16, and L3 processing unit 16 may send out a Router Advertisement message to local wireless network 2. This process enables accurately instructing the timing for starting transmission of a Router Advertisement message by L3 processing unit 16, thus making wireless terminal 20 rapidly detect connection with new router 10 (router B (10b) here). Consequently, wireless terminal 20 can execute a router switching process rapidly.

Connection management unit 13 of router B (10b), if detecting disconnection of the external link of lower layer processing unit 11 before sending out connection instruction reply message 1100 or connection completion notice message 1200, transmits a link disconnection notice message to router A (10a). This disconnection notice message is created by setting '1' indicating a state of being unconnectable with an external link to status 1304 of connection possibility notice message 1300.

Connection management unit 13 of router A (10a), responding to the reception of a link disconnection notice message from router B (10b), quits the state of waiting for reception of connection instruction reply message 1100 or connection completion notice message 1200. Further, connection management unit 13 notifies router switching unit 14 of the reception of a link disconnection notice message from router B (10b), and router switching unit 14 deletes the entry corresponding to router B (10b) from router information management table 90.

In step S604, if switching-origin router A (10a) determines that the communication quality (QoS) and the like received from switching-destination router B (10b) are inadequate, can request switching-destination router B (10b) to cancel the connection instruction. In this case, switching-destination router B (10b), if having already started a process for connecting with an external link, discontinues the process, as well as with the terminal.

Further in this embodiment, switching-destination router B (10b) connects to an external link after determining the status in steps S651 through S654, but not limited. Switching-destination router B (10b) can not start a process for connecting with an external link or a terminal if judging that there is no possibility of connecting with an external link or the QoS requirements are not satisfied. In this case, switching-destination router B (10b) is to quit the entire process after transmitting a connection instruction reply message.

In this embodiment, connection management unit 13 of router 10 is to acquire all the messages through lower layer processing unit 12. However, the acquisition may be performed through L3 processing unit, which enables switching between routers 10 belonging to different media if local wireless network 2 is constructed with plural communication media.

An identifier, other than address information, for specifying transmission origin router 10 (or connection management unit) is defined between the routers, and a field in which the identifier is described is provided in the connection instruction message, connection instruction reply message, connection completion message, connection possibility notice message, connection request message, and notice registration message, according to the present invention. This makeup allows a router and a wireless terminal that received these messages especially from a router including plural lower layer processing units 12 connecting to a local network, to easily identify a source of the messages. Consequently, a router switching process including monitoring a sending/receiving state can be executed in an integrated way, thus improving the process efficiency.

As described above, a router according to the present invention exchanges messages with a switching-destination router in real time according to events such as a deteriorated state of an external link and establishing a link, to implement rapid router switching and to reduce packet loss.

Next, a description is made for the operation of router 10 for requesting another router to send out the above-described connectivity notice.

First, the router as the request-origin of a connectivity notice (router A (10a)), in order to learn in real time whether or not another router (router B (10b)) can establish an external link, transmits a notice registration message to router B (10b). This notice registration message 1500 registers a message intended to be acquired in real time when an event occurs, where the registration could be made only for a router intended to transmit to. Here, the notice registration message at this moment requests for transmission of connection possibility notice message 1300, when the possibility of establishing an external link becomes definite.

FIG. 16 illustrates the format of notice registration message 1500. In FIG. 16, address field 1501 shows the source address (From) and destination address (To) for a message; type field 1502, a value for identifying a notice registration message; event type field 1504, the identifier of a notice (event) message to be delivered. That is, setting the identifier of each message to event type field 1504 allows registering requests for sending out a message (e.g. link disconnection notice message, connection completion notice message) for notifying of a state change (event) related to lower layer processing unit 11 and the external link, occurring asynchronously, excluding connection possibility notice message 1300.

A detailed description is made for the operation of sending out above-described notice registration message 1500 to another router.

Specifically, router switching unit 14 of router A (10a) instructs connection management unit 13 to request router B (10b) to transmit connection possibility notice message 1300 in real time. Connection management unit 13, responding to the instruction, transmits to router B (10b), notice registration message 1500 with the identifier of connection possibility notice message 1300 described therein. At this moment, connection management unit 13 generates an entry corresponding to an event management table as shown in FIG. 18. More specifically, connection management unit 13 generates an entry where event type 101 is connection possibility notice message 1300; delivery destination 102, "00:00:00:00:00:00"; and local delivery destination 103, router switching unit 14. In this case, event transmission origin 104 may be added in order to distinguish an event notice generated in the device from that generated in an external device. In FIG. 18, the address of router B (10b) is temporarily assumed to be "11:22:33:44:55:66". This addition allows connection management unit 13 of router A (10a) to deliver to router switching unit 14, an event notice only in router B (10b) originally desired, thus reducing a processing load.

Next, connection management unit 13 of router B (10b), when receiving this notice registration message 1500, registers the information notified to event management table 100 shown in FIG. 17.

Specifically, connection management unit 13 of router B (10b) describes the identifier of a notice message (connection possibility notice message 1300, here) to be registered, in event type 101; and the address (temporarily assumed to be "22:33:44:55:66:77" here) of router A (10a), in delivery destination 102. FIG. 17 shows for reference entries indicating that a link disconnection notice message will be delivered to address "33:44:55:66:77:88", and connection possibility notice message 1300 is delivered to router switching unit 14 in the device as well.

In this way, connection management unit 13 of router B (10b), when receiving the state and property of a link or an event notice from lower layer processing unit 12, judges whether the forwarding destination is an external device or an internal processing unit, according to event management table 100. Then, if the forwarding destination is an external device, connection management unit 13 sends out to the external device, a message including the information received.

Meanwhile, connection management unit 13 of router B (10b), when receiving a connection possibility notice from lower layer processing unit 11, or when detecting connection possibility from the state of lower layer processing unit 11 that the self manages, searches for router A (10a) intending to acquire connection possibility notice message 1300, in reference to event management table 100. Then, connection management unit 13 of router B (10b) generates connection possibility notice message 1300 according to a connection possibility notice acquired from lower layer processing unit 11 or self-detected information, and transmits the message to router A (10a).

Here, a connection possibility notice acquired from lower layer processing unit 11 may be equal to connection possibility notice message 1300 transmitted to router B (10b), and thus connection management unit 13 is to transfer to router A (10a), connection possibility message 1300 acquired from lower layer processing unit 11, without especially generating a message, possibly improving efficiency in a notice message process.

In the example of event management table 100 shown in FIG. 17, connection possibility notice message 1300 is copied and delivered to router switching unit 14 as well. However, this is not related to the router switching process according to the embodiment, but an example.

Although FIG. 17 does not exemplify, a notice message can be copied and distributed to plural processing units in the device. In this case, in order to reduce a processing load on the device and transfer delay, the message content is not actually copied, but the memory area storing the message content is distributed with a notice message, and each processing unit that has received the notice refers to the notified memory area.

Here, connection management unit 13 of router A (10a) that has received connection possibility notice message 1300, referring to event management table 100 shown in FIG. 18, transfers to router switching unit 14, actual connection possibility notice message 1300 received or information included in the message.

Then, connection management unit 13 of router B (10b) that has received notice registration message 1500, when completing registration in event management table 100, may return a notice registration completion message to router A (10*a*). This operation allows router A (10*a*) to respond to loss of notice registration message 1500 on the network, thus enabling reliable registration.

An identifier for uniquely identifying router A (10*a*) or its connection management unit 13, between routers, besides the addresses of lower layer processing units 11, 12, a router that has received notice registration message 1500 can specify a router of the source and destination of message transmission. This is effective for specifying a device if plural connection management units 13 exist in one router 10, or if devices are connected through plural lower layer processing units 11, 12. In such a case, a device identifier field needs to be provided in which an identifier for uniquely identifying router 10 or connection management unit 13, in event management table 100 and/or router information management table 90 as well.

By including the type (information for identifying a communication medium further minutely such as IEEE 802.11, IEEE 802.16, cellular, Ethernet (registered trademark), and/or a communication interface identifier) of lower layer processing unit 11 used for exchanging messages, in notice registration message 1500, router 10 that has received notice registration message 1500 may specify lower layer processing unit 12 for sending out messages, according to the information. Further, connection management unit 13 may preliminarily store an interface identifier for identifying lower layer processing unit 12 that has received notice registration message 1500, in event management table 100 and/or router information management table 90, to send out a requested message through the lower layer processing unit specified by the interface identifier preliminarily stored.

A field for requesting the timing and allowable frequency for receiving notice messages may be added to notice registration message 1500 according to the property and operation performance of the device itself, or necessity for messages. For example, for the purpose of requesting for a given notice message to be continuously transmitted at a certain interval, in order to improve the reliability when message missing occurs, a transmission time interval and the maximum number of transmitting can be specified. In order to reduce a processing load in a case where notice messages continuously occur in a short period, the time interval of transmission of notice messages can be specified. In order to determine the transmission order in a case where notice messages simultaneously occur, an important message can be acquired preferentially with an order of priority specified.

If router 10 has plural interfaces corresponding to lower layer processing unit 12 connectable to local wireless network 2, there are following two methods for determining an interface for sending/receiving notice registration message 1500 and its subsequent messages.

The first method is to select an interface in which connection has been established or is being established. With this method, registration and sending/receiving messages immediately become possible, and a registration process can be executed without checking the interface of router 10 at the other party again.

The second method is to select an interface with a high communication property. A communication property here refers to communication quality, communication bandwidth, immediacy of communication, reliability of communication, and the like, where judgment is made by one or a combination of them. The method suppresses retransmission of messages, enabling message transmission with a short transmission delay. Consequently, a rapid and reliable registration process and message exchange are possible. Communication properties other than those described above may include traffic characteristic, communication cost (e.g. charge), and communication area.

If an interface selected has not established connection or is not connected, a connection establishing process or physical connection need to be executed before delivering notice registration message 1500 or receiving a notice message.

In transmitting a message, plural interfaces may be selected, which improves the reliability of message transmission.

As described above, an interface with which messages are transmitted can be selected even if the router has plural interfaces corresponding to lower layer processing unit 12 and has established plural connections with one router 10, and each connection is registered.

For example, the router transmits through all or plural selected interfaces to improve the reliability in message transmission. Meanwhile, the router transmits through one interface selected to reduce the load for a message transmission process. Here, the router can use the above-described communication property in selecting an interface.

If registration can be made through plural interfaces, the router may provide an entry for managing them in router information management table 90.

Connection management unit 13 may acquire as capability information, information indicating that a connection-destination device has a connection management unit and whether or not various types of messages can be exchanged, when or before connection is established by lower layer processing unit 12. For this purpose, lower layer processing unit 12 exchanges information indicating whether or not the self device has a connection management unit, with another router, using control messages before or at connection. Then, the connection management unit of each device manages a situation where a periphery device has a connection management unit.

In this way, a router learns that a connection-destination device is loaded with connection management unit 13, before or at establishing connection, to be able to register an event notice as described above, and thus can acquire various types of notice messages in real time. Consequently, the router can execute a movement detection process in router switching and a general handover.

In this embodiment, connection management unit 13 is to send out messages through lower layer processing unit 12. However, the unit may send out through L3 processing unit 16 or upper layer processing unit 17. Concrete examples of L3 processing unit 16 include an IP stack; and those of upper layer processing unit 17 include a TCP/UDP stack, SIP stack, and/or HTTP stack.

If connection management unit 13 sends out through upper layer processing unit 17, connection management unit 13 connects with upper layer processing unit 17.

Connection management unit 13, when transmitting a message, may include an IP address, MAC address, host identifier such as a host name, or interface identifier, in the message, to identify connection management unit 13 as its transmission destination. These addresses and identifiers can be acquired through a processing unit that manages and controls them, an application, or user setting.

The process executed by the connection management unit described in this embodiment may be executed as appropriate by router switching unit 14.

Next, a description is made for the makeup and basic operation of wireless terminal 20.

Figure 2:
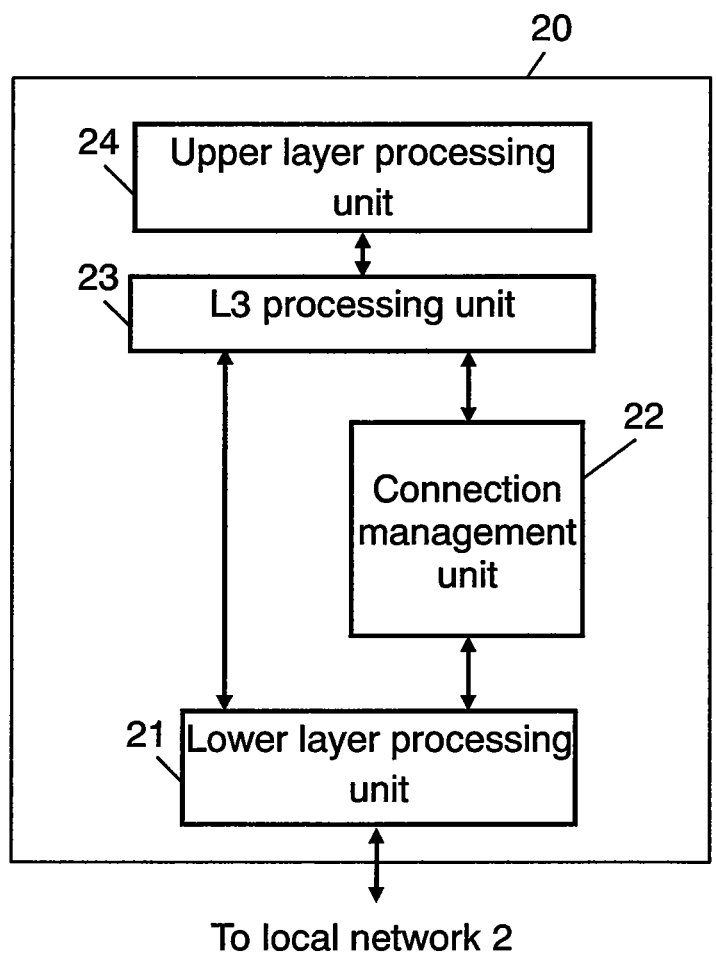
FIG. 2 illustrates the makeup of a terminal according to the first embodiment of the present invention.

FIG. 2 is a block diagram of wireless terminal 20.

In FIG. 2, lower layer processing unit 21 executes a physical layer process and a data link layer process, and connects to local wireless network 2; connection management unit 22 executes the process related to the router switching process according to the present invention; L3 processing unit 23 executes a network layer process; and upper layer processing unit 24 executes a transport layer process and higher, including an application.

FIG. 2 illustrates the makeup of wireless terminal 20 functioning as a host. However, the present invention does not limit the number of lower layer processing units, but wireless terminal 20 can include more of them and function as a router in local wireless network 2.

Wireless terminal 20 can be implemented with the similar makeup even if including two or more lower layer processing units, and its operation can be executed through the following procedure.

Lower layer processing unit 21 can be a unit based on a wireless communication standard such as wireless LAN (e.g. Bluetooth (registered trademark), UWB, IEEE 802.11). In wireless terminal 20, lower layer processing unit 21 can be applied with Bluetooth SIG (Special Interest Group) standard, in the same way as in the makeup of router 10 shown in FIG. 19. Further, lower layer processing unit 21 connects with connection management unit 22 and L3 processing unit 23 in the same way as a router.

Here, connection management unit 22 corresponds to a connection management unit according to the present invention; and lower layer processing unit 21 and L3 processing unit 23, to a receiving unit of the present invention.

Hereinafter, a description is made for the basic operation of wireless terminal 20 with the above-described makeup.

First, the sending/receiving operation of wireless terminal 20 according to the embodiment is described below.

Initially, a frame received from local wireless network 2 undergoes a physical layer protocol process and a data link layer protocol process by lower layer processing unit 21, and then transferred to L3 processing unit 23.

L3 processing unit 23, responding to the frame, executes an IP protocol process and then transfers the frame to upper layer processing unit 24. Next, upper layer processing unit 24 executes an upper layer process including an application.

User data transmitted from upper layer processing unit 24 is transferred to L3 processing unit 23, undergoes an IP protocol process, and then is transferred to lower layer processing unit 21. Next, lower layer processing unit 21 executes a data link layer protocol process and a physical layer protocol process, and sends out the data to local wireless network 2.

Further, L3 processing unit 23 extracts information on the network and router 10 from a Router Advertisement message received from local wireless network 2 and manages the information.

Next, a description is made for a router switching process in wireless terminal 20 using the related drawings.

Figure 8A:
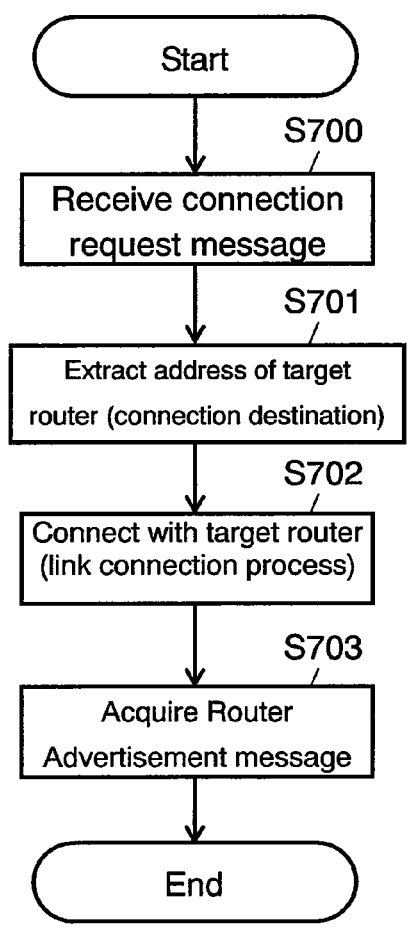
FIG. 8A is a flowchart showing an operation example of a terminal according to the first embodiment of the present invention.

FIG. 8A is a flowchart showing the process when receiving connection request message 1400 from router A (10a).

First, in FIG. 8A, connection management unit 22, when receiving connection request message 1400 from lower layer processing unit 21 (step S700), extracts the address of router B (10b) as a connection target from router address field 1404 (step S701).

Next, the connection management unit 22 executes a process for link connection with router B (10b) (step S702).

Next, the connection management unit acquires an Router Advertisement message from router B (10b), to update the router list managed by L3 processing unit 16 (step S703).

Here, connection management unit 22 may acquire connection request message 1400 through L3 processing unit 23. If connection with router B (10b) extracted in step S701 has been completed already, connection management unit 22 omits step S702 to avoid redundant connection.

Wireless terminal 20, unless processing connection request message 1400, does not need to provide connection management unit 22, but can use wireless terminal 20 conventionally used without being changed.

Figure 8B:
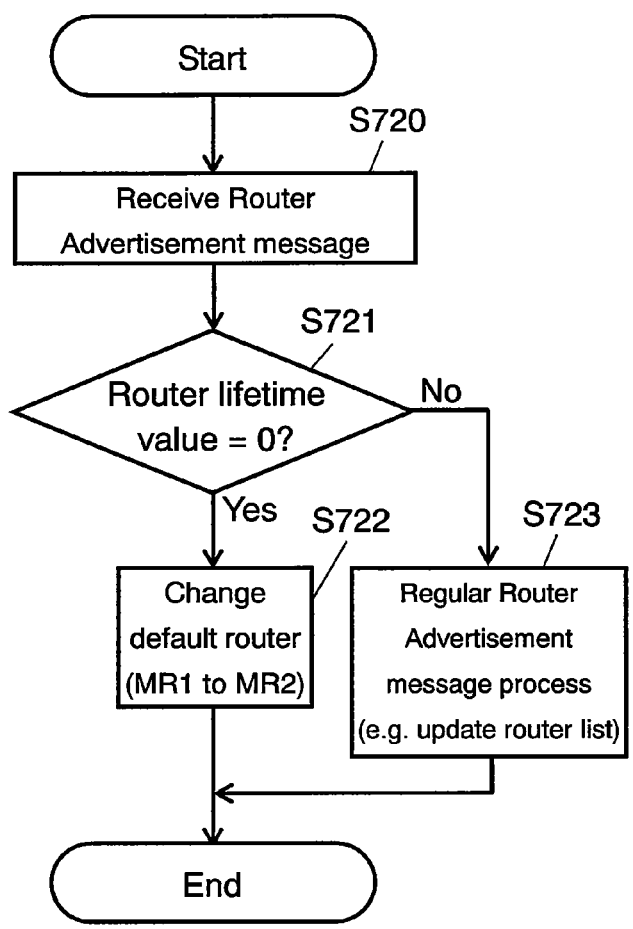
FIG. 8B is a flowchart showing an operation example of the terminal according to the first embodiment of the present invention.

FIG. 8B is a flowchart showing a process when receiving a Router Advertisement message from router A (10a) as a path switching instruction message.

In FIG. 8B, first, L3 processing unit 23 receives a Router Advertisement message through lower layer processing unit 21 (step S720). Connection management unit 22, if the router lifetime (RL) of the Router Advertisement message received is '0,' updates the router list; if router 10 is a default router, changes the default router (step S722). In this case, L3 processing unit 23, because receiving a Router Advertisement message with RL='0' from router A (10a) as a default router, changes the next hop of the default route from router A (10a) to router B (10b), to complete the router switching process. Wireless terminal 20, if the router lifetime of the Router Advertisement message received is not '0,' executes a regular Router Advertisement message process (step S723).

Wireless terminal 20 according to the present invention, thus performing link connection with a switching-destination router during a router switching process, can promptly perform packet communication with an external network through the switching-destination router when the switching process completes, to implement rapid router switching. For a connection process from router B (10b) to wireless terminal 20, wireless terminal 20 executes a connection process by the conventional, standard connecting method with lower layer processing unit 21, thus dispensing with a special means.

In the communication system shown in FIG. 3, composed of router 10 and wireless terminal 20 operating as described above, a description is made for the operation when the relay node is switched from router A (10a) to router B (10b) while wireless terminal 20 is performing packet communication with external terminal 40.

Figure 4:
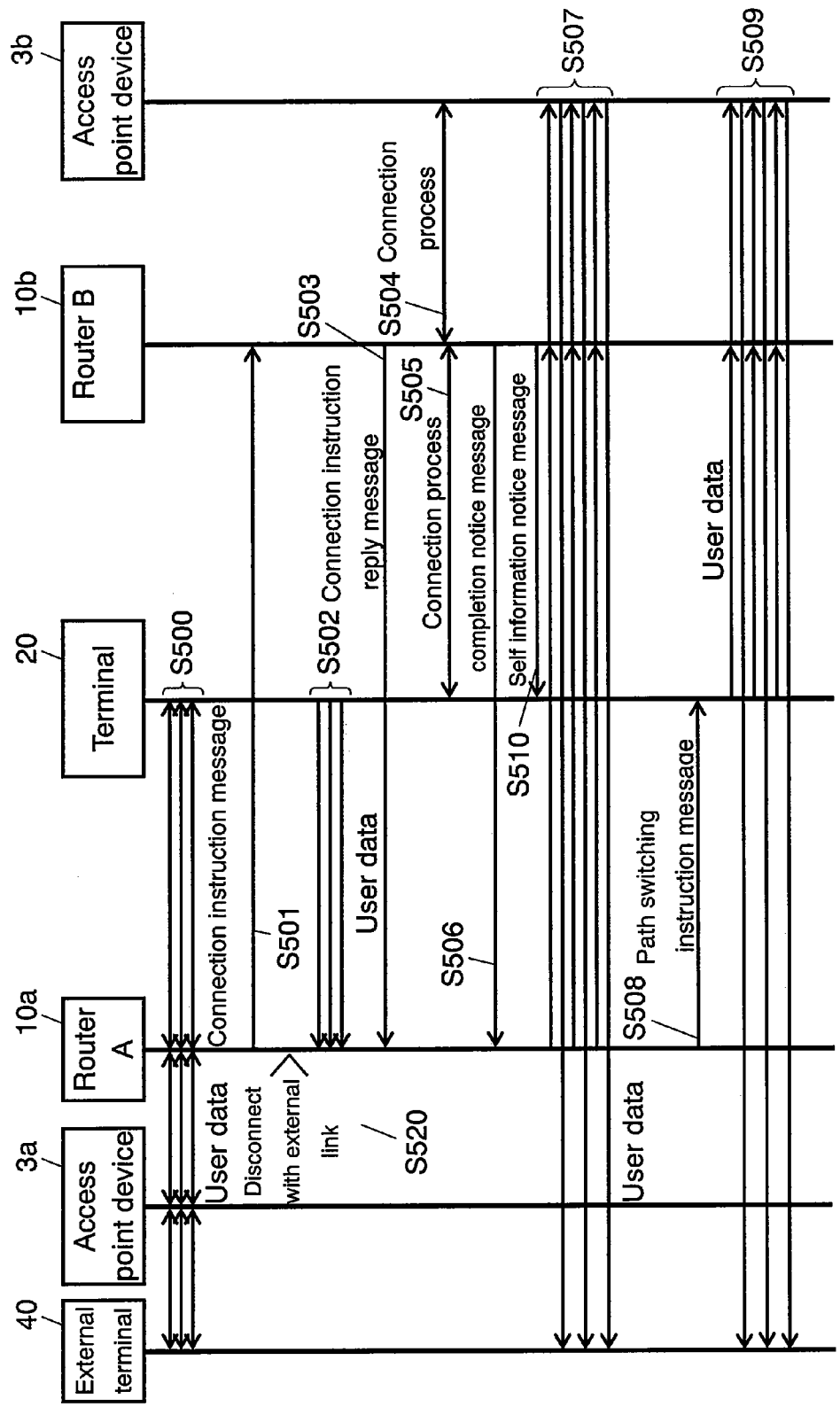
FIG. 4 is a sequence diagram showing the first operation of the communication system according to the first embodiment of the present invention.

FIG. 4 is a sequence diagram showing the first operation of the communication system according to the embodiment.

Router A (10a) on local wireless network 2 connects with access point device 3a, and wireless terminal 20 is performing packet communication for user data through external terminal 40 and router A (10a) (step S500). When router A (10a) detects the possibility of disconnection with an external link, because the communication state of the external link between router A (10a) and access point device 3a has deteriorated, or because disconnection of the communication link has been requested explicitly from a user or upper layer (step S520), router A (10a) sends out connection instruction message 1000 to router B (10b) on local wireless network 2 (step S501). Since then, router A (10a) relays packets transmitted by wireless terminal 20, to external terminal 40 through access point device 3a, while communication with access point device 3a is available. However, router A (10a) temporarily accumulates the packets in a buffer if the connection with access point device 3a stops (step S502).

Router B (10b) that has received connection instruction message 1000 checks the connectivity with access point device 3b and returns connection instruction reply message 1100 to router A (10a) if connection is possible (step S503). Router B (10b) may return connection instruction reply message 1100 only when denying the connection instruction because the connection with access point device 3b is impossible, or requirements of the QoS or bandwidth of connection instruction message 1000, or connection time are not satisfied.

Next, router B (10*b*) executes a process for link connection with access point device 3*b* (step S504) and a process for link connection with wireless terminal 20 described in terminal address field 1007 of connection instruction message 1000 (step S505). The order of executing steps S503, S504, and S505 does not need to be as illustrated, but step S503 may be executed immediately after starting steps S504 and S505, or these steps may be executed simultaneously.

Next, router B (10*b*), when completing process for connection with both wireless terminal 20 and access point device 3*b*, sends out connection completion notice message 1200 to router A (10*a*) (step S506). Router B (10*b*) sends out a Router Advertisement message to the local wireless network as a self information notice message for notifying of its own network information (step S510). With this message, wireless terminal 20 adds router B (10*b*) in the router list.

Router A (10*a*), responding to this operation, if accumulating relay packets related to wireless terminal 20, transfers them to router B (10*b*), and router B (10*b*) relays them to external terminal 40 through access point device 3*b* (step S507). Here, the timing when transferring the packets accumulated by router A (10*a*) to router B (10*b*) may be that after step S503, where a connection instruction reply message is received. In such a case, router B (10*b*) temporarily accumulates the packets transferred in a buffer until the process for connection with access point device 3*b* completes.

Router A (10*a*) that has received connection completion notice message 1200 sends out a Router Advertisement message with its router lifetime of '0' as a path switching instruction message, to local wireless network 2 (step S508). With this message, wireless terminal 20 changes the default router in the router list from router A (10*a*) to router B (10*b*).

Since then, wireless terminal 20 can perform packet communication with external terminal 40 through router B (10*b*) (step S509).

Router B (10*b*) may send out a path switching instruction message to local wireless network 2 on behalf of router A (10*a*), simultaneously with or instead of transmitting connection completion notice message 1200. The path switching instruction message at this moment is a Router Advertisement message with the IP address of router A (10*a*) described in the source address field of the IP header and the router lifetime of '0.'

Router A (10*a*), responding to the message, does not need to send out a path switching instruction message. A terminal on local wireless network 2 can receive a path switching instruction message earlier than that for router A (10*a*), thus implementing further rapid path switching.

Figure 5:
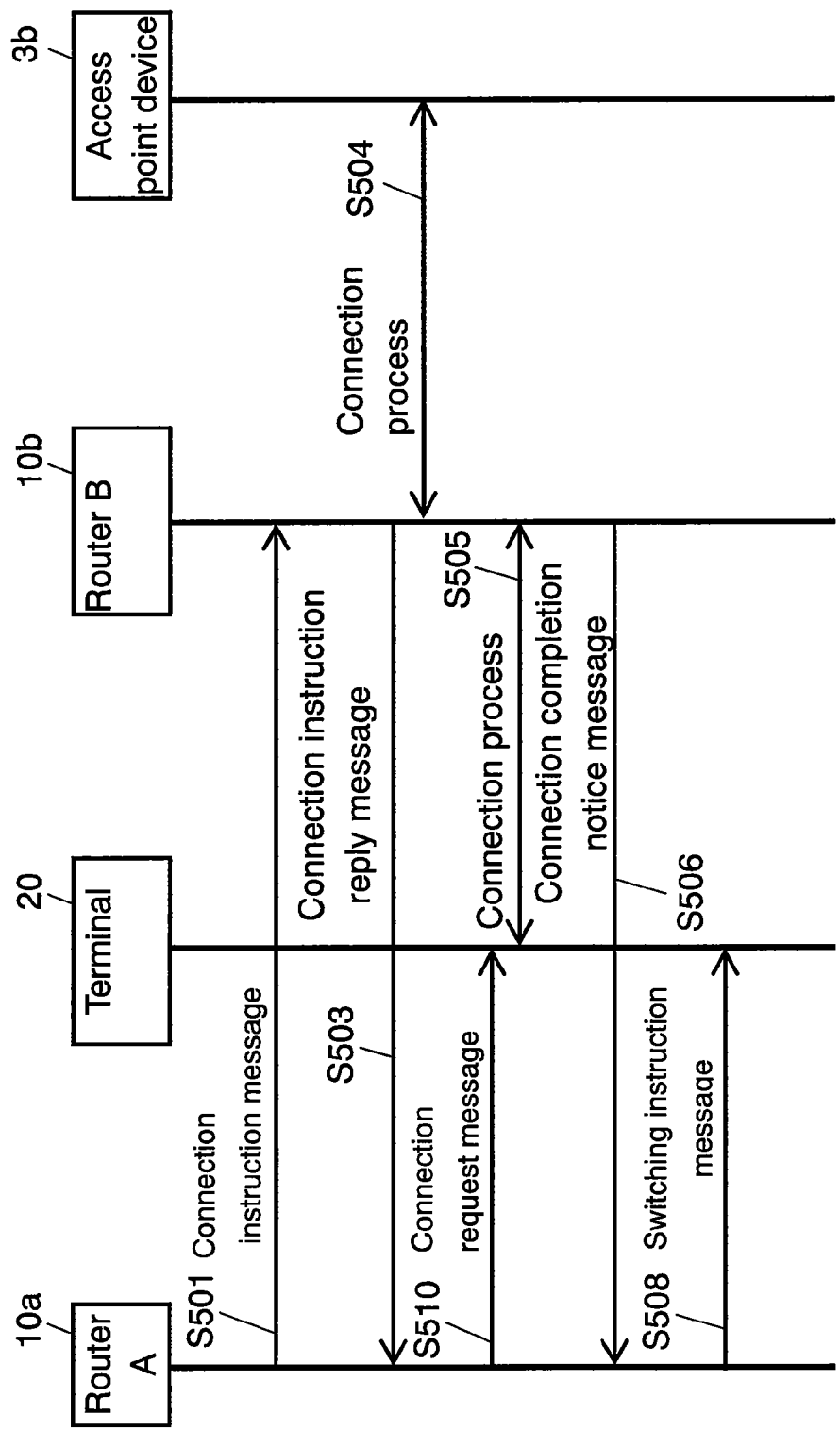
FIG. 5 is a sequence diagram showing the second operation of the communication system according to the first embodiment of the present invention.

FIG. 5 is a sequence diagram showing the second operation of the communication system according to the embodiment.

The basic operation is the same as that of the sequence diagram shown in FIG. 4, and thus the flow of user data is omitted. Hereinafter, a description is made only for the differences from the sequence described in FIG. 4.

In FIG. 5, router A (10*a*), when transmitting connection instruction message 1000 (step S501) and consequently receiving connection instruction reply message 1100 from router B (10*b*) (step S503), sends out connection request message 1400 with the address of router B (10*b*) described in router address field 1404, to wireless terminal 20 (step S510). Wireless terminal 20, responding to the message, executes a process for link connection with router B (10*b*) (step S505). Router B (10*b*), having acquired the address of wireless terminal 20 through connection instruction message 1000, can send out connection completion notice message 1200, when both a connection process started by wireless terminal 20 (step S505) and a process for connecting with access point device 3*b* are completed. Wireless terminal 20, by receiving an instruction of link connection with router B (10*b*), from router A (10*a*) already having a communication link, can execute a process for connecting with router B (10*b*) highly reliably (step S510).

In this way, the embodiment exchanges messages between routers in real time according to events such as a deteriorated state of an external link and establishing a link, and executes a process for link connection between the router and the terminal as part of the switching process, to implement rapid router switching and to reduce packet loss.

Further, according to the embodiment, a switching-destination router notifies of completion of connection with an external network in real time and controls every switching timing, to avoid wasting switching time and occurrence of packet loss, thus executing router switching at an optimum timing.

The switching-destination router executes the operation for establishing link connection with a terminal on the LAN while executing connection with an external network, thus handling a case where link connection is not established between the terminal and the switching-destination router.

Furthermore, the switching-destination router starts switching when completing connection with an external network and establishing link connection with the terminal, and thus the terminal can immediately updates the routing table including link connection with the switching-destination router already established, and can rapidly switch the default router to the switching-destination router. The terminal simply needs to update the routing table and to change the default router in router switching, and does not need to manage the time until the routing function of the switching-origin router stops and the time until the switching-destination router becomes routable.

In this embodiment, a given QoS level and bandwidth value are used as an example of information related to QoS, but not limited and other information may be used.

In this embodiment, the description is made for a router relaying by IP. However, the present invention is practicable in the same way for a bridge relaying at layer 2 and a gateway (including NAT/NAPT device) relaying at an upper layer.

In the embodiment, router A (10*a*) is to have a function as a switching-origin router; and router B (10*b*), as a switching-destination router. However, both router A (10*a*) and router B (10*b*) may have both functions.

Among the messages described in this embodiment, especially a message for instructing a specific process such as a connection instruction message and a connection request message may be called an instruction command. That is, a message for instructing a specific process in the present invention is a command to a remote communication device, and thus may be referred to as a remote command. Specifically, each message is called a remote connection instruction command, remote connection request command, or the like.

In the same way, a message for notifying of a specific state change (event) such as a connection completion notice message, connection instruction reply message, connection possibility notice message, and link disconnection notice message, may be called an event notice. That is, a message for notifying of a specific state change (event) in the present invention is an event notice to a remote communication device in, and thus may be referred to as a remote event. Specifically, each message is called a remote connection completion event, remote connection instruction reply event, remote connection possibility event, or link disconnection event.

Further in the same way, a message for requesting making deliver an event notice such as a notice registration message in real time may be referred to as event registration or an event registration command. That is, a message for requesting an event notice in the present invention is event registration to a remote communication device, and thus it can be called remote event registration or a remote event registration command.

Executing a registration process including an authentication process, for a transmission-destination device prior to executing a remote command can implement a remote command process with high reliability. Especially executing comprehensive registration prior to issuing the command dispenses with authentication each time issuing plural commands. This reduces a processing load on the device and enables a prompt command process.

With the above-described expression, connection possibility notice message 1300 can be referred to as remote transfer of a "link detected event" issued by a lower layer processing unit to notify of the possibility of connection although the relevant link is not connected, namely a "remote link detected event." Meanwhile, message 1300 can be referred to as remote transfer of a "link going-up event" issued by a lower layer processing unit to notify that the relevant link is establishable and is during a connection process, namely a "remote link going-up event," or as remote transfer of a "link up event" issued by a lower layer processing unit to notify that the connection of the relevant link has already been established, namely a "remote link up event".

Connection instruction message 1000 can be referred to as a combination of remote transfer of a "link configuration command," namely "remote link configuration command" and "remote event registration" that registers real-time issuance of a "remote link up event" to be described later. The "link configuration command" is used to instruct lower layer processing units 11, 12 to start a process for connecting a relevant link. Lower layer processing units 11, 12, when receiving a "link configuration command," starts a process for establishing a link according to information required for connection such as the identifier of the party on the other end of the connection, included in the command.

In this view, combining connection instruction message 1000 with "remote event registration" that registers real-time issuance of a "remote link going-up event" allows a "remote link going-up event" corresponding to a connection instruction reply message to be acquired in real time. Further, combining connection instruction message 1000 with remote transfer of a "link going-down event," namely a "remote link going-down event," allows implicitly soliciting router B (10*b*) for a prompt switching process as well. Here, a "remote going-down event" is what is issued by lower layer processing units 11, 12 to notify that judgment has been made that the link will be disconnected in a short time because of a deteriorated communication state, by the result of monitoring a decrease of the intensity of received radio waves or an increase of the bit error rate.

Connection request message 1400 can be referred to as a combination of a "remote link configuration command" and a "remote event registration" that registers real-time issuance of a "remote link up event." In this view, "remote event registration" can be combined as well that registers real-time issuance of a "remote link going-up event," for the purpose of monitoring the status of a connection process.

Connection instruction reply message 1100 can be referred to as remote transfer of a "link going-up event" issued by a lower layer processing unit to notify that the relevant link is establishable and is in a connection process, namely a "remote link going-up event."

Connection completion notice message 1200 can be referred to as remote transfer of a "link up event" issued by a lower layer processing unit to notify that the connection of the relevant link has completed, namely a "remote link up event."

In this embodiment, the description is made for a method of devolving the relay function between routers. However, the messages described in this embodiment can be used as well for relay path switching on the initiative of the network side when a communication terminal without a relay function moves across network access point devices.

Second Exemplary Embodiment

A description is made for the second exemplary embodiment of the present invention using the related drawings.

Figure 20:
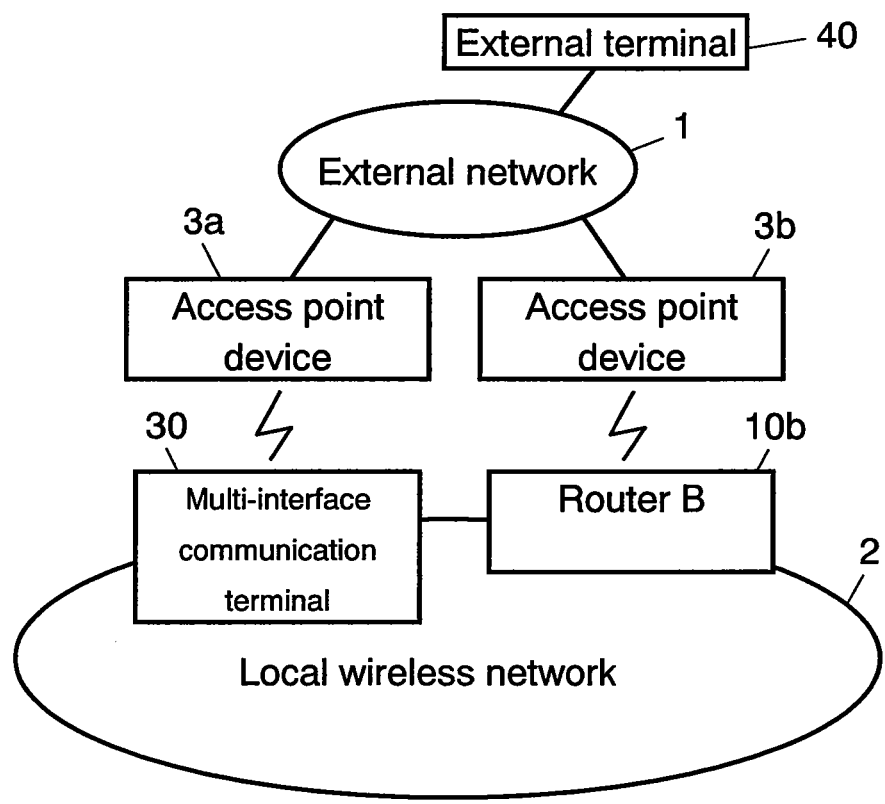
FIG. 20 illustrates the makeup of a communication system according to the second exemplary embodiment of the present invention.

FIG. 20 illustrates the makeup of a communication system according to the embodiment, which is different from that of the first exemplary embodiment in including multi-interface communication terminal 30 having a communication flow with external terminal 40, instead of switching-origin router A (10*a*) and wireless terminal 20. This multi-interface communication terminal 30 is different from a router in not including a relay function, where its makeup is the same as that shown in FIG. 1.

Firstly, a description is made for the operation of multi-interface communication terminal 30 and router B (10*b*), only about the differences from the first exemplary embodiment.

First, router switching unit 14 of multi-interface communication terminal 30, when detecting a deteriorated state of the communication with access point device 3*a*, transmits connection instruction message 1000 to router B (10*b*) through connection management unit 13. At this moment, what is different from the first exemplary embodiment is that the address of wireless terminal 20 does not need to be described in terminal address field 1007, and thus the embodiment can omit terminal address field 1007.

Next, the process flow of router B (10*b*), if connection instruction message 1000 received does not include terminal address field 1007, or if terminal address field 1007 does not include a valid address, proceeds to the next step when completing connection with an external link in step 658 in FIG. 7.

Since then, multi-interface communication terminal 30 executes the process as router A (10*a*) described in the first exemplary embodiment. Eventually, terminal 30 receives connection completion notice message 1200 from router B (10*b*) (steps S605, S606 in FIG. 6), and router switching unit 14 of multi-interface communication terminal 30 sends out a path switching instruction message to L3 processing unit 16 (step S607 in FIG. 6) and updates the routing table managed by L3 processing unit 16.

In other words, connection management unit 13 of multi-interface communication terminal 30 sets the interface corresponding to lower layer processing unit 12 as the default route, while having set the interface corresponding to lower layer processing unit 11 as the default route, and sets the default router to router B (10*b*).

Meanwhile, connection management unit 13 of multi-interface communication terminal 30 deletes routing information related to the interface corresponding to lower layer processing unit 11. This process enables multi-interface communication terminal 30 to switch the communication flow terminated by upper layer processing unit 17 from that via lower layer processing unit 11 to that via lower layer processing unit 12, to send/receive through router B (10*b*).

As described above, the present invention allows multi-interface communication terminal 30 to rapidly switch from the interface to its own external link to a router, thus reducing packet loss.

Industrial Applicability

The present invention is useful for switching between plural routers having a connection capability through wireless communication, and suitable for rapidly switching a router to another when disconnection with an external network is expected.

The invention claimed is:

1. A path switching method for switching traffic between an external terminal in an external network and a local terminal in a local wireless network through a plurality of communication devices having a plurality of communication interfaces, on the local wireless network, comprising:
- a step in which a first communication device relays the traffic;
- a step in which the first communication device sends out a connection instruction with QoS requirement for the traffic to a second communication device;
- a step in which the second communication device, when receiving the connection instruction, starts a process for connection establishment for the local terminal according to the QoS requirement to the external network, and a process for connection establishment to the local terminal;
- a step in which the second communication device, when completing the connection establishment to the external network and the connection establishment to the local terminal, sends out a connection completion notice for notifying of completion of the connection establishment, to the first communication device;
- a step in which the first communication device, when receiving the connection completion notice, sends out buffered packets for the local terminal if the first communication device stores;
- a step in which the local terminal switches the path to the external terminal from the first communication device to the second communication device; and
- a step in which the second communication device relays the traffic,
- wherein the connection process by the second communication device is started when the connection being established to the external network satisfies the QoS requirements, and the second communication device has a step of sending out a connection instruction reply for notifying the first communication device that connection with the external network has been started,
- wherein the second communication device does not start the process for connecting to the external network, if the connection to the external network can not be established, or if the QoS requirements are not satisfied although the connection can be established, and
- wherein the second communication device further has a step of sending out a connection instruction reply for notifying that connection establishment to the external network is not executed.

2. The path switching method of claim 1, further comprising a step in which the first communication device, if receiving a connection instruction reply for notifying that connection with the external network has not been executed, from the second communication device, sends out a path switching instruction to a third communication device.

3. A path switching method for switching traffic between an external terminal in an external network and a local terminal in a local wireless network through a plurality of communication devices having a plurality of communication interfaces, on the local wireless network, comprising:
- a step in which a first communication device relays the traffic;
- a step in which the first communication device sends out a connection instruction with QoS requirement for the traffic to a second communication device;
- a step in which the second communication device, when receiving the connection instruction, starts a process for connection establishment for the local terminal according to the QoS requirement to the external network, and a process for connection establishment to the local terminal;
- a step in which the second communication device, when completing the connection establishment to the external network and the connection establishment to the local terminal, sends out a connection completion notice for notifying of completion of the connection establishment, to the first communication device;
- a step in which the first communication device, when receiving the connection completion notice, sends out buffered packets for the local terminal if the first communication device stores;
- a step in which the local terminal switches the path to the external terminal from the first communication device to the second communication device;
- a step in which the second communication device relays the traffic;
- a step in which the second communication device, when it is getting possible to establish a connection to the external network with the QoS requirements, sends out a connection possibility notice including information about possibility of connection establishment on the second communication device to the first communication device;
- a step in which the first communication device, when receiving the connection possibility notice, stores the information about possibility of connection establishment on the second communication device in a storage; and when the information about possibility of connection establishment indicates that it is impossible to establish connection, deletes the information about possibility of connection establishment on the second communication device from the storage; and
- a step in which the first communication device, when sending out the connection instruction, decides the second communication device as a destination of the connection instruction if the information about possibility of connection establishment on the second communication device in the storage indicates that it is possible to establish a connection.

4. The path switching method of claim 3,
- wherein the connection possibility notice includes an identifier of a communication device and performance of communication with an external network; and
- wherein the first communication device determines a connectable communication device having communication performance suitable for a property of a relay flow, in communication with the external network, as a sending-out destination of the connection instruction.

* * * * *